(12) United States Patent
Firehammer

(10) Patent No.: US 8,427,107 B2  
(45) Date of Patent: Apr. 23, 2013

(54) SYSTEM AND METHOD FOR EXTENDING THE USABLE CAPACITY OF A BATTERY PACK VIA CONTROLLING BATTERY CURRENT THROUGH DIFFERENT CURRENT PATHS

(75) Inventor: Paul W. Firehammer, Saline, MI (US)

(73) Assignee: A 123 Systems, Inc., Waltham, MA (US)

( * ) Notice: Subject to any disclaimer, the term of this patent is extended or adjusted under 35 U.S.C. 154(b) by 126 days.

(21) Appl. No.: 12/820,433

(22) Filed: Jun. 22, 2010

(65) Prior Publication Data
US 2011/0309799 A1    Dec. 22, 2011

(51) Int. Cl.
H01M 10/44    (2006.01)
H01M 10/46    (2006.01)

(52) U.S. Cl.
USPC .......................................... 320/128

(58) Field of Classification Search ............... 320/107, 320/112, 116, 125, 127, 128, 130, 135
See application file for complete search history.

(56) References Cited

U.S. PATENT DOCUMENTS

| | | | |
|---|---|---|---|
| 3,626,270 A * | 12/1971 | Burkett et al. ............... | 320/129 |
| 7,193,392 B2 | 3/2007 | King et al. | |
| 7,245,108 B2 | 7/2007 | Chertok et al. | |
| 7,378,818 B2 | 5/2008 | Fowler et al. | |
| 7,612,537 B2 | 11/2009 | Wynne et al. | |
| 2005/0073282 A1* | 4/2005 | Carrier et al. ................. | 320/106 |
| 2007/0108941 A1* | 5/2007 | Sainomoto et al. ........... | 320/112 |
| 2008/0286639 A1 | 11/2008 | Yusa et al. | |
| 2009/0169978 A1 | 7/2009 | Smith et al. | |
| 2010/0237828 A1* | 9/2010 | Maegawa ....................... | 320/118 |

FOREIGN PATENT DOCUMENTS

| | | |
|---|---|---|
| EP | 1035599 A1 | 9/2000 |
| EP | 1939956 A1 | 7/2008 |

OTHER PUBLICATIONS

Firehammer, Paul W. et al., "System and Method for Balancing Voltage of Individual Battery Cells Within a Battery Pack," U.S. Appl. No. 12,820,411, filed Jun. 22, 2010, 76 pages.

Firehammer, Paul W., "System and Method for Managing Charge Within a Battery Pack," U.S. Appl. No. 12/820,421, filed Jun. 22, 2010, 79 pages.

ISA Korea, International Search Report of PCT/US2011/041361, Dec. 23, 2011, WIPO, 5 pages.

* cited by examiner

Primary Examiner — Edward Tso
(74) Attorney, Agent, or Firm — Alleman Hall McCoy Russell & Tuttle LLP

(57) ABSTRACT

Systems and methods for extending the useable capacity of a battery pack are disclosed. In one example, flyback transformers supply charge to lower capacity battery cells to extend battery output.

20 Claims, 14 Drawing Sheets

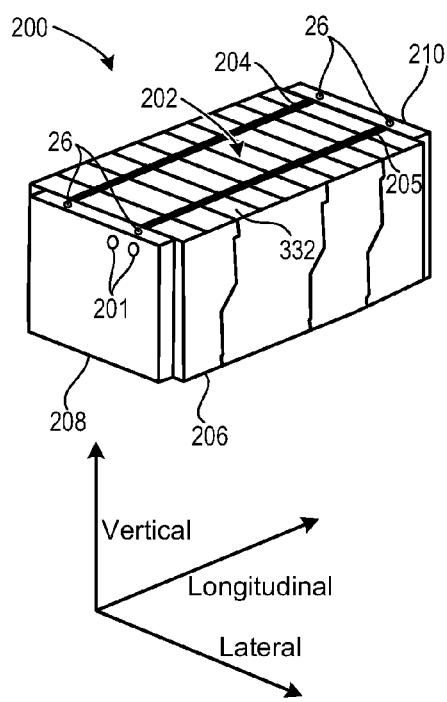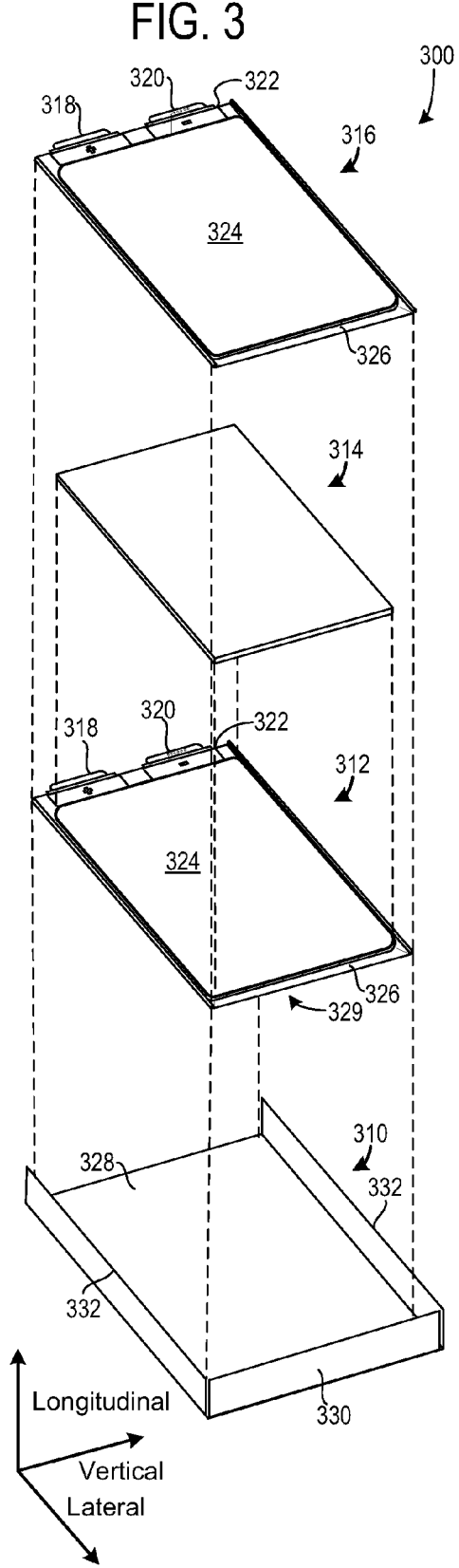

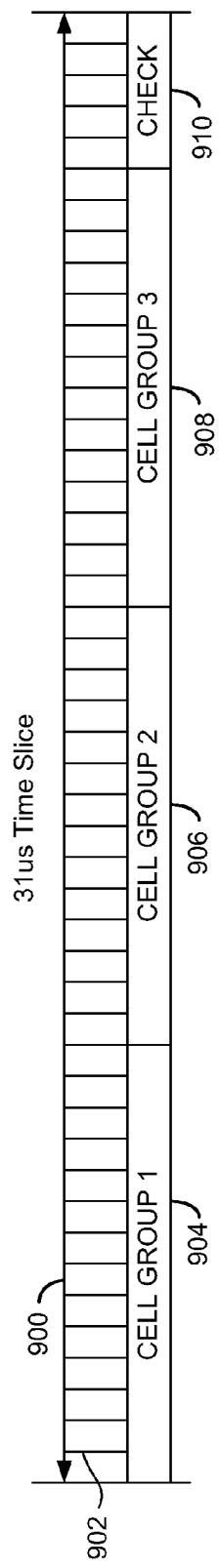

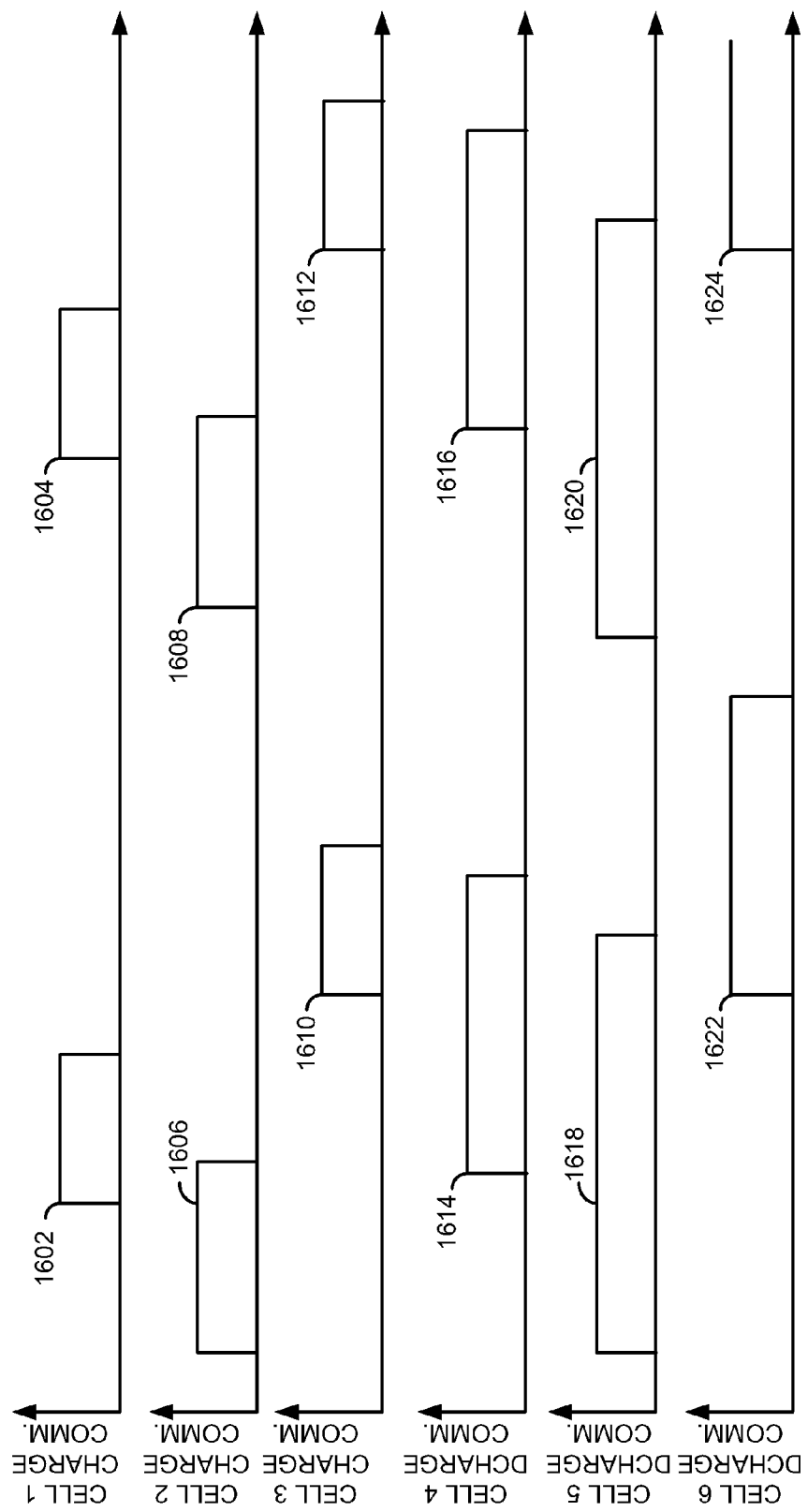

SYSTEM AND METHOD FOR EXTENDING THE USABLE CAPACITY OF A BATTERY PACK VIA CONTROLLING BATTERY CURRENT THROUGH DIFFERENT CURRENT PATHS

TECHNICAL FIELD

The present description relates to extending the operating time of a battery pack. In one example, the battery pack provides power to a vehicle.

BACKGROUND AND SUMMARY

Many hybrid and electric vehicles receive at least a portion of motive power from batteries. The batteries may be comprised of battery cells that are combined in series and parallel to provide power to an electric motor that propels the vehicle. During battery discharge, the duration of a discharge cycle may be limited by an amount of charge retained by the battery cell that has the lowest charge capacity. For example, if a first and second battery cell of a battery are charged to the same level, and the first battery cell has a charge capacity of 0.25 amp-hours while the second battery cell has a charge capacity of 0.3 amp-hours, the first battery cell will reach a predetermined recharge voltage (e.g., a predefined voltage at which battery cell discharge is stopped and recharging is initiated) before the second battery cell if both battery cells are discharged at the same rate. As a result, the battery discharge cycle is cut short by the lower capacity battery cell reaching the recharge voltage before the higher capacity battery cell reaches the recharge voltage. Once the lower capacity battery cell reaches the recharge voltage the battery discharge cycle is stopped so that the lower capacity battery cell is not degraded. Consequently, the battery may have a significant but unusable amount of stored charge in higher capacity battery cells that is unavailable during a discharge cycle. Therefore, the range of the vehicle that is operating under power from the battery may be limited.

The inventors herein have recognized that additional battery capacity may be available to power battery loads if the state of each battery cell is controlled during a battery discharge. Accordingly, the inventors herein have developed a method for extending the useable capacity of a battery pack, said battery pack comprising a plurality of battery cells, comprising: discharging a battery cell via a first current path during a battery discharge cycle; and charging said battery cell via a second current path during said battery discharge cycle.

A battery discharge cycle may be prolonged by supplying charge from higher capacity battery cells to lower capacity battery cells so that the charge of the lower capacity battery cell remains above a predetermined recharge voltage for a longer period of time. For example, if two battery cells start a discharge cycle from the same voltage level, the second battery cell may provide charge to the first battery cell by way of a flyback transformer. In this way, the first battery cell may remain at a voltage that is greater than a recharge voltage for a longer period of time. When both battery cells reach the recharge voltage the battery discharge cycle may be stopped.

The present description may provide several advantages. For example, the method may increase battery discharge cycle time. In addition, the present method may increase the range of electric or hybrid vehicles. Further, the system may increase battery cell life by exercising higher amounts of battery cell capacity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a schematic view of an exemplary battery module;

FIG. 3 shows an exploded schematic view of an exemplary battery cell stack;

FIG. 9 shows a schematic view of a microcontroller time slice;

FIG. 10 shows a table of example instructions for charging a group of battery cells;

FIG. 16 shows a schematic diagram of simulated electrical signals for charging and discharging a group of battery cells.

DETAILED DESCRIPTION OF THE DEPICTED EMBODIMENTS

Figure 1:
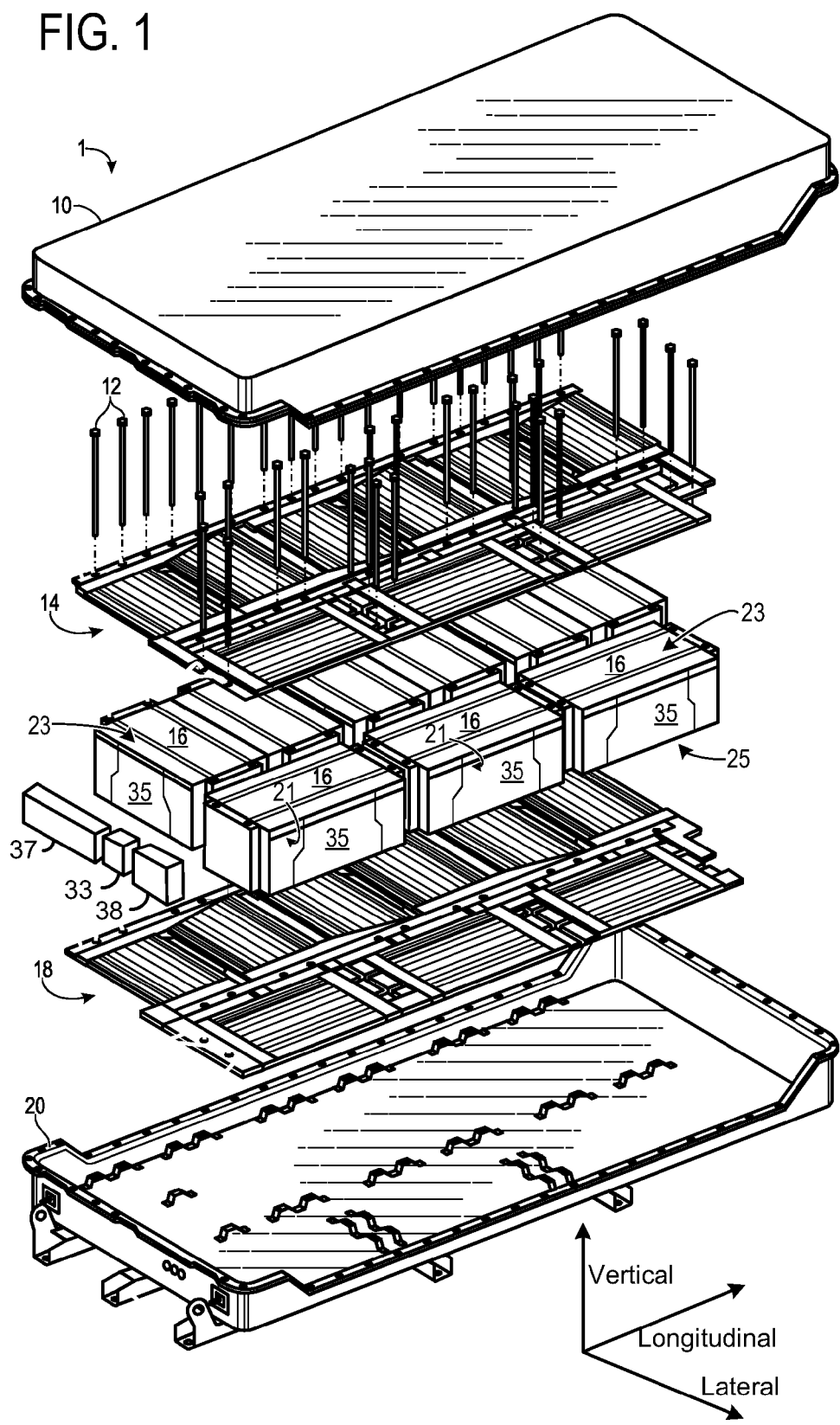
FIG. 1 shows an exploded schematic view of a battery pack or assembly.

The present description is related to extending the usable capacity of a battery pack. In one embodiment, battery cells such as those illustrated in FIG. 2 may be combined in a battery pack as illustrated in FIG. 1. The power from the battery cells may be selectively delivered to a load external to the battery pack. Within a battery pack, charge may be shuffled between battery cells by circuitry described in FIGS. 5 and 12. Charge can be shuffled between battery cells according to the methods of FIGS. 6-7 and 13-14 to extend battery discharge cycle duration. Further, charge may be moved within a battery pack according to the methods of FIGS. 8 and 15 to reduce current and electrical noise within a battery pack.

FIG. 1 shows an exploded view of a battery assembly 1. The battery assembly may include a cover 10, coupling devices 12, a first cooling subsystem 14 (e.g., cold plate), a plurality of battery modules 16, a second cooling subsystem 18 (e.g., cold plate), and a tray 20. The cover may be attached to the tray via a suitable coupling device (e.g., bolts, adhesive, etc.,) to form a housing surrounding the coupling devices, the cooling subsystems, and the battery modules, when assembled.

The battery modules 16 may include a plurality of battery cells configured to store energy. Although a plurality of battery modules are illustrated, it will be appreciated that in other examples a single battery module may be utilized. Battery modules 16 may be interposed between the first cooling subsystem 14 and the second cooling subsystem 18, where the battery modules are positioned with their electrical terminals on a side 21 facing out between the cooling subsystems.

Each battery module may include a first side 23 and a second side 25. The first and the second side may be referred to as the top and bottom side, respectively. The top and bottom sides may flank the electrical terminals, discussed in greater detail herein with regard to FIGS. 2-3. In this example, the top side of each battery module is positioned in a common plane in the battery assembly. Likewise, the bottom side of each battery module is positioned in another common plane in the battery assembly. However, in other examples only the top side or the bottom side of each battery module may be positioned in a common plane. In this way, the cooling subsystems may maintain direct contact with the top sides and the bottom sides of the battery modules to increase heat transfer and improve cooling capacity, as described in further detail herein, wherein the cooling subsystems and the battery modules may be in face-sharing contact. Additional details of an exemplary battery module are described herein with regard to FIGS. 2-3. In alternate examples, only one of the cooling subsystems may be included in battery assembly 1, such as an upper cooling subsystem (subsystem 14 in this example). Moreover, the position, size, and geometry of the first and second cooling subsystems are exemplary in nature. Thus, the position, size, and/or geometry of the first and/or second cooling subsystems may be altered in other examples based on various design parameters of the battery assembly.

Battery assembly 1 may also include an electrical distribution module 33 (EDM), monitor and balance boards 35 (MBB), a battery control module 37 (BCM), and a power supply module 38. Voltage of battery cells in battery modules 16 may be monitored and balanced by MBBs that are integrated onto battery modules 16. Balancing battery cells refers to equalizing voltages between a plurality of battery cells in a battery cell stack. Further, battery cell voltages between battery cell stacks can be equalized. MBBs may include a plurality of current, voltage, and other sensors. The EDM controls the distribution of power from the battery pack to the battery load. In particular, the EDM contains contactors for coupling high voltage battery power to an external battery load such as an inverter. The BCM provides supervisory control over battery pack systems. For example, the BCM may control ancillary modules within the battery pack such as the EDM and cell MBB, for example. Further, the BCM may be comprised of a microprocessor having random access memory, read only memory, input ports, real time clock, output ports, and a computer area network (CAN) port for communicating to systems outside of the battery pack as well as to MBBs and other battery pack modules. The power supply module provides a way of supplying charge for the secondary current path of the battery pack.

FIG. 2 shows an exemplary battery module 200 that may be included in the plurality of battery modules 16, shown in FIG. 1. Battery module 200 may include a battery cell stack having a plurality of stacked battery cells and output terminals 201. The stacked arrangement allows the battery cells to be densely packed in the battery module.

FIG. 3 shows an exploded view of a portion of an exemplary battery cell stack 300. As shown the battery cell stack is built in the order of a housing heat sink 310, battery cell 312, compliant pad 314, battery cell 316, and so on. However, it will be appreciated that other arrangements are possible. For example, the battery cell stack may be built in the order of a housing heat sink, battery cell, housing heat sink, etc. Further in some examples, the housing heat sink may be integrated into the battery cells.

Battery cell 312 includes cathode 318 and anode 320 for connecting to a bus bar (not shown). The bus bar routes charge from one battery cell to another. A battery module may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery module. Battery cell 312 further includes prismatic cell 324 that contains electrolytic compounds. Prismatic cell 324 is in thermal communication with cell heat sink 326. Cell heat sink 326 may be formed of a metal plate with the edges bent up 90 degrees on one or more sides to form a flanged edge. In the example of FIG. 3, two opposing sides include a flanged edge. However, other geometries are possible. Battery cell 312 is substantially identical to battery cell 316. Therefore similar parts are labeled accordingly. Battery cells 312 and 316 are arranged with their terminals in alignment and exposed. In battery module 200 shown in FIG. 2 the electric terminals are coupled to enable energy to be extracted from each cell in the battery module. Returning to FIG. 3, compliant pad 314 is interposed between battery cell 312 and battery cell 316. However, in other examples the compliant pad may not be included in the battery cell stack.

Housing heat sink 310 may be formed by a metal plate having a base 328 with the edges bent up 90 degrees on one or more sides to form a flanged edge. In FIG. 3 longitudinally aligned edge 330 and vertically aligned edges 332 are bent flanged edges. As depicted, the housing heat sink is sized to receive one or more battery cells. In other words, one or more battery cells may be positioned within base 328. Thus, the flanged edges of the battery cells may be in contact with housing heat sink and underside 329 of battery cell 312 may be in contact with the base of the housing heat sink, facilitating heat transfer.

One of the longitudinally aligned edges 332 of the housing heat sink 310 may form a portion of the top side 202 of battery module 200, as shown in FIG. 2. Similarly, one of the longitudinally aligned edges 332 may form a portion of the bottom side of the battery module. Thus, the longitudinally aligned edges of the housing heat sink may be in contact with the first and the second cooling subsystems to improve heat transfer. In this way, heat may be transferred from the battery cells to the exterior of the battery module.

The battery cells may be strapped together by binding bands 204 and 205. The binding bands may be wrapped around the battery cell stack or may simply extend from the front of the battery cell stack to the back of the battery cell stack. In the latter example, the binding bands may be coupled to a battery cover. In other embodiments, the binding bands may be comprised of threaded studs (e.g., metal threaded studs) that are bolted at the ends. Further, various other approaches may be used to bind the cells together into the stack. For example, threaded rods connected to end plates may be used to provide the desired compression. In another example, the cells may be stacked in a rigid frame with a plate on one end that could slide back and forth against the cells to provide the desired compressive force. In yet other embodiments, rods held in place by cotter pins may be used to secure the battery cells in place. Thus, it should be understood that various binding mechanisms may be used to hold the cell stack together, and the application is not limited to metal or plastic bands. Cover 206 provides protection for battery bus bars (not shown) that route charge from the plurality of battery cells to output terminals of the battery module.

The battery module may also include a front end cover 208 and a rear end cover 210 coupled to the battery cell stack. The front and rear end covers include module openings 26. However, in other examples the module openings may be included in a portion of the battery module containing battery cells.

Various methods are available to determine battery state of charge. By knowing the state of charge of a battery cell it is possible to determine whether or not the battery cell may accept additional charge. Further, by knowing the state of charge of a battery cell it is possible to determine when it is undesirable to further discharge a battery cell. One method of determining battery state of charge includes determining battery cell voltage.

Figure 4:
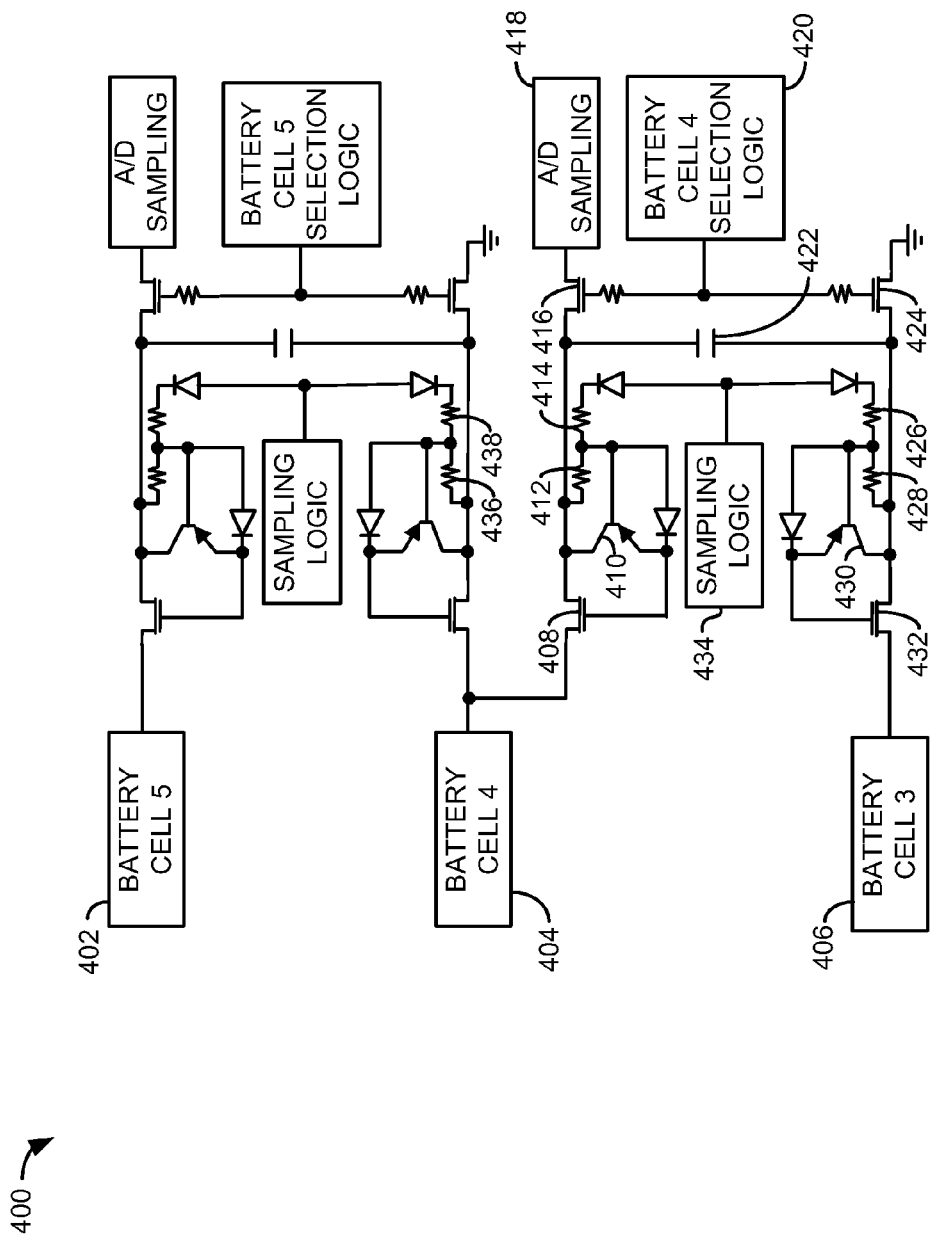
FIG. 4 shows a schematic diagram of battery cell monitoring hardware.

Referring now to FIG. 4, a schematic view of an example simplified battery cell voltage monitoring control circuitry is shown. Circuit 400 shows one type of battery cell voltage monitoring input circuit although other circuit variations may also be anticipated although not shown.

MBB circuitry can be configured to monitor a variable number of battery cells and each battery cell may be referenced to a different voltage (e.g., an adjacent battery cell voltage). Circuit 400 depicts the higher potential sides of battery cells 3-5 at 402-406. Note that although battery cells of a cell stack may be coupled in parallel, the MBB monitors series connected battery cells. Battery cells coupled in parallel are treated as a single battery cell for charging and discharging purposes when coupled in series with other battery cells.

The MBB battery cell monitoring and balancing is controlled by a microcontroller. The microcontroller decides under what conditions battery cells are monitored and when sampling of the battery cells occurs. Battery cell selection logic from the microcontroller is simplified and illustrated at 420. Battery cell selection logic activates and deactivates field effect transistors (FET) 416 and 424. When FETs 416 and 424 are activated battery cell voltage may be sampled by A/D converter 418. Battery cell voltage may be sampled across capacitor 422 when FETs 408 and 432 are conducting.

The operating state of FETs 408 and 432 is controlled by PNP transistors 410 and 430. The operating state of PNP transistors 410 is controlled by current that flows from bias resistors 412 and 414 through PNP transistor 410. The operating state of PNP transistors 430 is controlled by current that flows from bias resistors 426 and 428 through PNP transistor 430. The current that flows from bias resistors 412 and 414, as well as current that flows from bias resistors 426 and 428, depends on the level of voltage available at sampling logic block 434 and the bias resistor values. The bias resistor value varies as the battery reference value varies. For example, as the number of battery cells increase and the low side of the monitored battery potential increases from ground reference, resistance of one of the bias resistors decreases. Thus, bias resistors 436 and 438 may be different than similarly placed bias resistors 426 and 428.

Sampling logic block 434 is comprised of circuitry that allows the MBB microcontroller to vary the transistor drive current depending on the voltage level of battery cell being sampled. In one example, a first circuit topology using PNP transistors are such as those illustrated in FIG. 4 are used to couple battery cells that are closer in potential to the ground reference to the A/D sampling circuitry, while in a second circuit and second topology, NPN transistors are used to couple battery cells that are closer in potential to the higher level voltage potential (e.g., the potential of the 16th battery cell in a 16 cell battery stack). However, a majority of the monitor circuits can be configured in the PNP configuration illustrated in FIG. 4 because the desired transistor switching may be facilitated by adjusting bias resistors.

Figure 5:
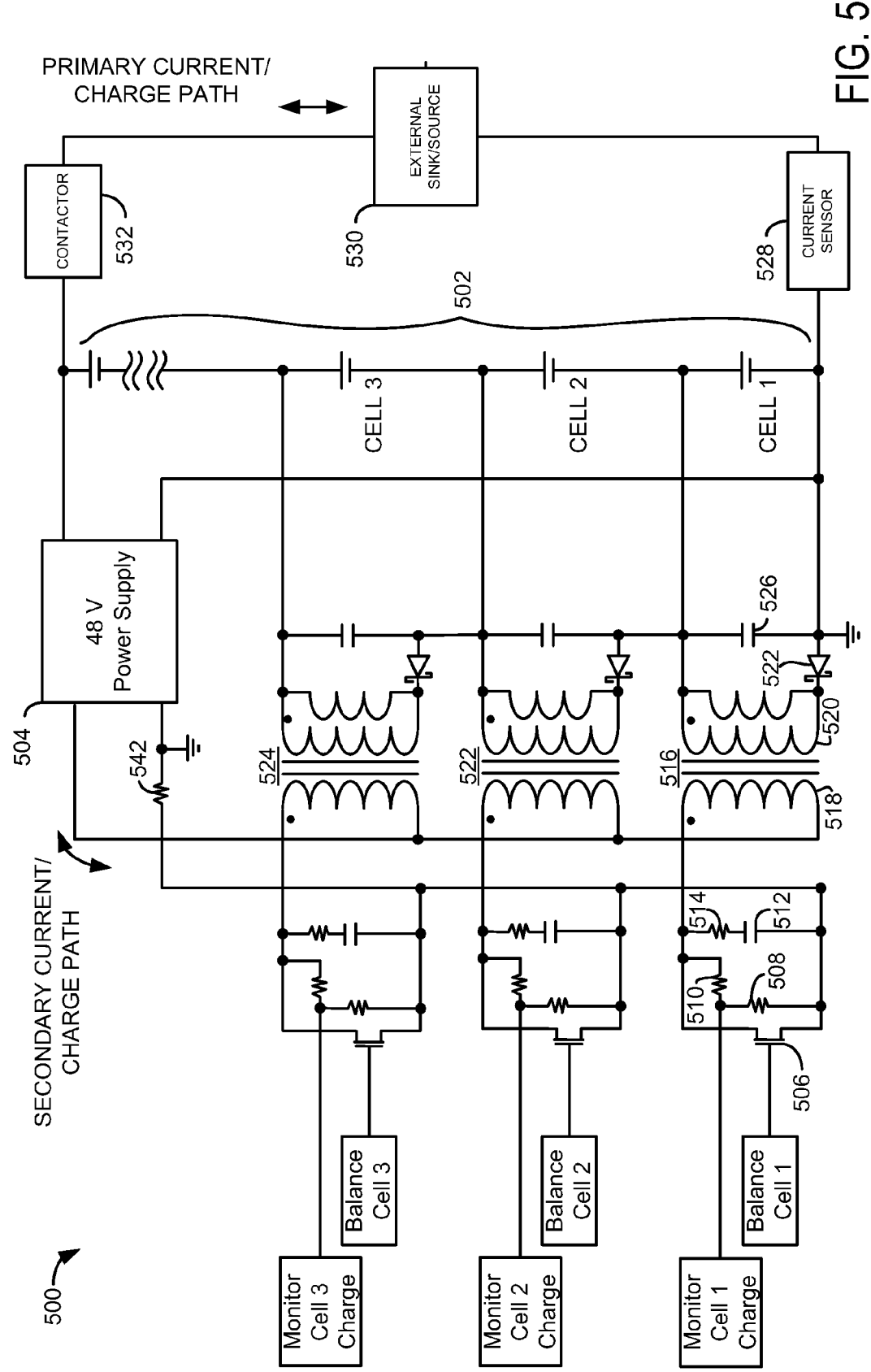
FIG. 5 shows a schematic diagram of battery cell active balancing and charging circuitry.

Referring now to FIG. 5, a schematic diagram of battery cell active balancing circuitry is shown. Circuit 500 shows active balancing circuitry for three battery cells although the circuitry is applicable for additional or fewer battery cells as indicated by the break in between battery cells connection near the top of FIG. 5. Battery cells 502 are shown coupled in series, however, additional battery cells may be coupled in parallel to the illustrated battery cells though each series battery cell should be coupled to an equivalent number of battery cells as other series battery cells. For example, if battery cell number one is comprised of four battery cells in parallel, then battery cells number two and three should also be comprised of four battery cells in parallel. Such a battery cell configuration acts to ensure each battery cell is drained and charged at substantially the same rate as other battery cells through a primary current path. Battery pack capacity is increased when battery cells are coupled in parallel. Battery cells coupled in parallel with battery cells 502 do not affect the active balancing circuitry, but parallel battery cells do change the charge capacity and therefore may affect the amount of current that may be sourced or sunk. Battery cells 502 act through contactor 532 to sink and/or source current to loads or sources that are external to the battery pack. Current flowing between battery cells 502 and sink/source 530 is monitored by current sensor 528. In one embodiment, the path current flows between the battery cells and the external sink/source may be referred to as the primary current path. The path current flows between the battery cells and the flyback transformers may be referred to as the secondary current path.

As illustrated, power supply 504 is supplied power by all battery cells in the battery cell stack. Thus, power supply 504 can draw current equally from battery cells 502. In this way, power supply 504 is configured so as to reduce imbalance between battery cells of a battery cell stack. In one embodiment, power supply 504 is a DC/DC converter that routes power to the primaries of the flyback transformers on all MBBs in the battery pack. As illustrated, power from power supply 504 is routed to a primary side of flyback transformers 516, 522, and 524.

In an alternative embodiment where a total module voltage is in a range of 36 volts to 48 volts, the flyback primaries of one module can be supplied power by directly connecting the flyback primaries to the output terminals of a different module. For example, the flyback primaries of the MBB on module number two are supplied power from the voltage output terminals of module number one. Module number three flyback primaries are supplied power from the voltage output terminals of module number two, and module number one flyback primaries are supplied power from the voltage output terminals of module number three.

Flyback transformer 516 can transfer power from primary coil 518 to secondary coil 520 when current flow is switched on and off through FET 506. Charge from power supply 504 is stored in a magnetic field produced by primary coil 518 when current flows through primary coil 518. Charge is transferred to secondary coil 520 when current flow in primary coil 518 is stopped causing the magnetic field to collapse. The collapsing magnetic field induces a current in the secondary coil 520 and allows a battery cell to be charged. In one example, FET 506 is switched on and off at a rate of 32 KHz. FET 506 conducts when a voltage is applied to the gate of FET 506. A microcontroller on the MBB may be configured to turn FET 506 on and off by changing the state of a digital output. In one example, FET 506 is controlled according to the method of FIGS. 6-8.

Shottky diode 522 acts to rectify flyback transformer output voltage when power is transferred from primary coil 518 to secondary coil 520. Further, Shottky diode 522 acts to block the battery cell from discharging into the secondary coil of flyback transformer 516. In other circuits (e.g., circuits with flyback transformers 522 and 524), Shottky diodes placed similarly to diode 522 perform similar functions with respect to flyback transformers 522 and 524. Capacitor 526 also acts to smooth the output of flyback transformer 516.

Battery cell charging is monitored by sensing a voltage that develops between resistors 508 and 510. Resistors 508 and 510 are coupled to one side of primary coil 518. In one embodiment, a voltage that develops between resistors 508 and 510 is monitored by an analog to digital (ADC) of the microcontroller on the MBB to determine charging of a battery cell. In other embodiments, the voltage between resistors 508 and 510 is monitored by a digital input.

Resistor 514 and capacitor 512 are coupled between ground and one side of transformer 516. Resistor 514 and capacitor 512 act as a snubber circuit to limit voltage at transformer 516 when current flow is stopped.

Thus, the system of FIG. 5 provides for a system for extending a useable capacity of a battery pack, comprising: a plurality of battery cells; a first current path for charging and discharging at least one battery cell, said first current path including said at least one battery cell of said plurality of battery cells; a second current path selectively magnetically coupled to said at least one battery cell, said second current path providing charge to said at least one battery cell, said charge provided according to a state of said at least one battery cell. The system including wherein said second current path further includes a DC/DC converter. The system including wherein said system further includes a plurality of voltage measurement circuits coupled to said plurality of battery cells. The system including a controller that selectively electrically couples said second current path to said first current path. The system including wherein said second current path includes a variable conductance switch. The system including wherein said battery cells are lithium-ion battery cells. The system including wherein said variable conductance switch is a field effect transistor. The system including a controller, said controller including instructions for adjusting charging of at least a battery cell via a secondary current path according to the state of said at least one battery cell.

Figure 6:
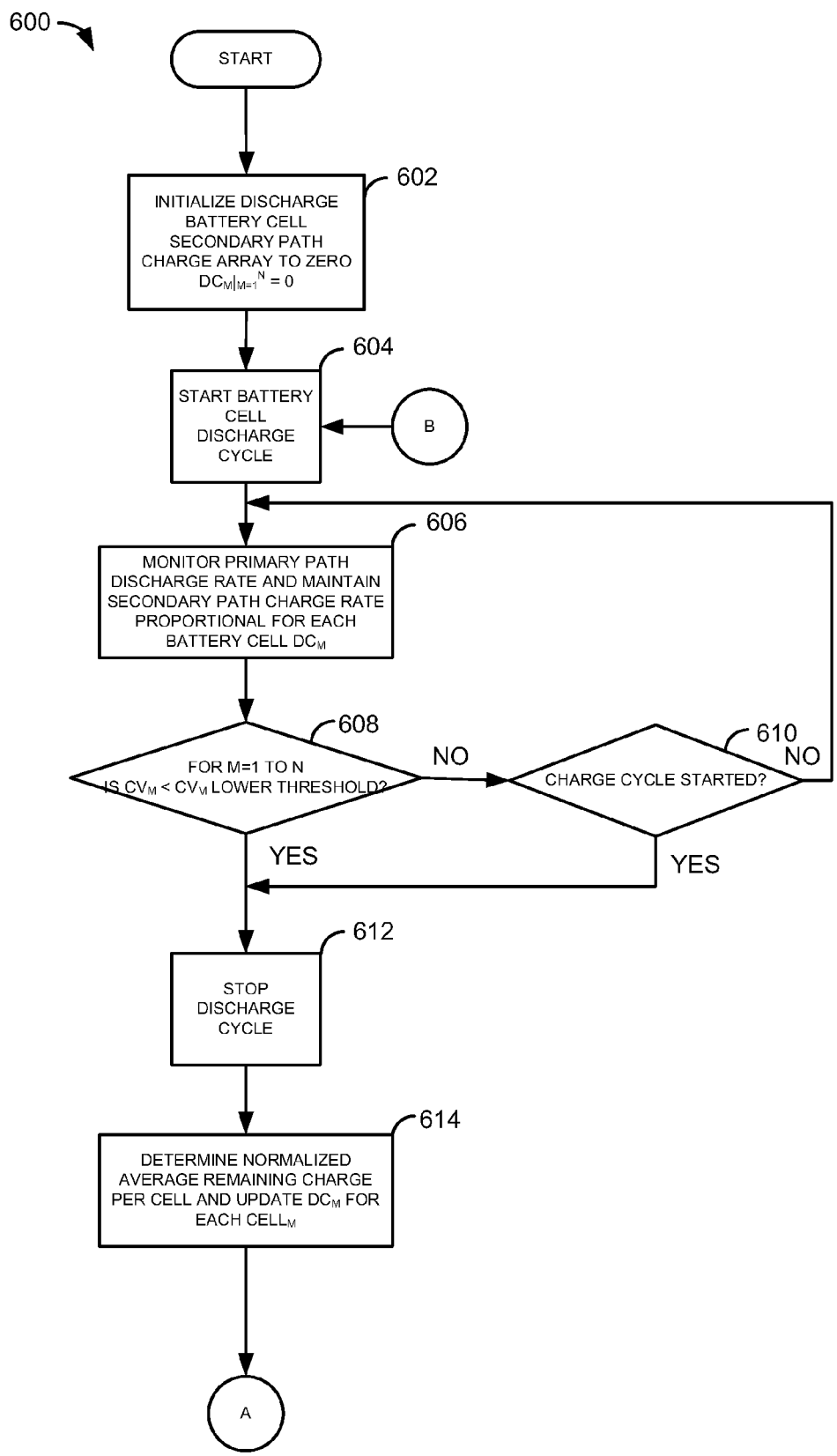
FIG. 6 shows a flow chart illustrating a method for controlling battery cell state of charge.

Referring now to FIG. 6, a flow chart of a method for controlling battery cell state of charge is illustrated. Battery cells may be charged by way of two different current paths. The first path may be referred to as the primary path. In some examples, the secondary current path may be electrically coupled to the primary current path solely through flyback transformers and the battery cells. In one example, the secondary current path includes a power supply that is powered by battery cells in the primary current path. The primary path allows current to flow into or out of the battery pack to charge and discharge battery cells. The secondary current path is a path where battery cells within the battery pack may provide charge to or receive charge from other battery cells within the battery pack. FIG. 5 shows an example of a primary current path and a secondary current path.

At 602, an array that contains the amount of charge to be applied to the individual cells of a battery cell stack during a battery discharge cycle is initialized to zero. In one embodiment, the array is called DC and it contains values that represent the secondary path charge amount that each battery cell receives during a discharge cycle. In one example, the units of DC are coulombs per amp of net battery pack current delivered to an external load, where net battery current is total battery current delivered minus battery current received during a discharge cycle. The array may be indexed as $DC_M$ where M is the battery cell number in the battery cell stack. The initialization operation may be described mathematically as $DC_M|_{M=1}^{N}=0$ where M is the individual battery cell number and N is the total number of cells. Thus, when a battery pack is new and has not been discharged, no current is provided to battery cells by way of the second current path. After the battery pack has completed a discharge cycle, the array DC may be updated so as to provide current to battery cells that reach a lower charge threshold before other battery cells in the battery cell stack. Routine 600 proceeds to 604 after the secondary current path charge array is initialized.

In one example, a battery discharge cycle may be a period of time a battery cell is not in electrical communication with a charger that is external to a vehicle. Thus, in one example, a battery may be in a charging cycle when the battery is coupled to a charger that is external to a vehicle. Then, when the battery is uncoupled from the charger and provides current to propel the vehicle the battery is in a discharge cycle. Further, the battery may receive current from the vehicle during vehicle deceleration, and although the battery is sourcing and sinking current to operate the vehicle, it remains in a discharge cycle. Once the battery is electrically re-coupled to the charger it enters a charge cycle whether or not the battery was fully discharged during the discharge cycle. In other examples, a discharge cycle may be defined differently. For example, a discharge cycle may be defined as a period when the battery is supplying charge. Thus, during a driving cycle a battery may enter a plurality of discharge cycles.

At 604, the battery discharge cycle begins. In one example, the battery discharge cycle is initiated when the battery is decoupled from a charging unit. In other examples, the discharge cycle may be initiated when a driver makes a request to operate a vehicle and an electrical load is electrically coupled to the battery. In one example, the battery pack reaches the end of a discharge cycle when one or more of the battery cells in the battery pack reaches a lower charge threshold.

At 606, routine 600 monitors the discharge current in the primary current path and maintains a charge rate in the secondary path proportional to the primary path current for each battery cell $DC_M$ (e.g., battery cell M in the discharge array DC). For example, for a battery cell M, the charge delivered by way of the secondary current path during a battery discharge cycle is $I_{NET}$ multiplied by $DC_M$. Where $I_{NET}$ is the net battery current and $DC_M$ is the secondary path charge amount for battery cell M during a discharge cycle. The discharge of battery cells of a battery pack may be monitored by way of a current sensor. For example, current sensor 528 of FIG. 5 may be used to determine the battery pack and battery cell stack discharge rate.

In one embodiment, the secondary path charging rate of each battery cell requesting charge during a battery discharge is delivered to the assigned battery cell by switching a transistor on the primary side of a flyback coil. Battery cells requesting charge during a discharge cycle are indicated by a numeric value in the corresponding locations of array DC. For example, transistor 506 can be switched to transfer current from 48 volt power supply 504 to cell 1 of FIG. 5. In one example, transistor 506 is switched by a signal that is at a substantially constant frequency (e.g., 32 kHz). The duty cycle (e.g., the portion of a period of a cycle that a signal is in a high state) of the signal may be varied to adjust the rate at which current is delivered to the battery cell. For example, the 32 kHz signal having a 5% duty cycle provides a lower amount of current to charge a battery cell than does a 20% duty cycle. The numeric value contained in array DC may be input into a function that relates the secondary path charge amount to a duty cycle. For example, a charge rate of X coulombs per amp of net current in the primary charging and discharging path may correspond to a 20% duty cycle. Thus, a voltage applied to the primary side of flyback transformer 516 can be switched at different duty cycles to control the charging of battery cell 1. In other embodiments, the switching frequency of transistor 506 may be varied to adjust charging of battery cell 1. Further, timing of battery cell charging may be carried out as discussed with reference to FIGS. 9-11.

At 608, routine 600 judges whether or not one or more of the battery cells of the battery cell stack are at a voltage that is less than a lower threshold voltage. In one example, a plurality of networks as shown in FIG. 4 are selectively coupled to battery cells to determine the voltage of battery cells in a battery cell stack. In other embodiments, battery cell state of charge may be substituted for battery voltage so that routine 600 moves from 608 to 612 or 610 based on whether or not battery cell state of charge is less than a lower threshold. If one or more battery cells of the battery cell stack is below the lower threshold, routine 600 proceeds to 612. For example, if a battery cell stack is comprised of five series coupled battery cells (numbered 1-5) and battery cell number three discharges to a predetermined voltage before the four remaining battery cells of the battery cell stack, then routine 600 proceeds to 612. Otherwise, routine 600 proceeds to 610.

At 610, routine 600 judges whether or not a battery cell stack has entered a charging cycle. In one example, a charging cycle is initiated by an operator plugging a vehicle into a charger external from the vehicle. In another example, a charging cycle may be initiated when the battery is receiving current from external the battery pack. If routine 600 judges that a charging cycle has started, routine 600 proceeds to 612. Otherwise, routine 600 returns to 606.

At 612, routine 600 stops the battery cell discharge cycle. In one example, the battery discharge cycle is stopped by sending a status signal to the vehicle controller. Further, the battery output contactors may be set to an open state during a charging cycle. Routine 600 proceeds to 614 after the discharge cycle is stopped.

At 614, routine 600 updates the $DC_M$ array. After the discharge cycle is completed routine 600 determines adjustments to the $DC_M$ array. In some embodiments, the $DC_M$ array is not updated unless a threshold level of charge has been drawn from the battery pack. For example, in one embodiment the $DC_M$ array is not updated unless more than 20% of the battery pack charge is drawn from the battery pack. Further, the threshold level of charge at which the $DC_M$ is updated may vary depending on battery pack operating conditions. For example, array $DC_M$ may be updated when less charge has been drawn at higher battery temperatures.

Routine 600 determines updates to the $DC_M$ array in response to the state of charge of each battery cell of a battery cell stack after the battery discharge cycle is complete. In one example, battery cell state of charge is determined according to the method described in U.S. Patent Application Publication No. 2009/0326842 which is hereby fully incorporated for all intents and purposes. Routine 600 also determines the minimum charge remaining on the battery cells of the battery cell stack. In particular, routine 600 compares the charge of each battery cell of the battery cell stack and selects the lowest level of charge.

Routine 600 determines a normalized remaining charge for each battery cell of the battery cell stack according to the following equation:

$$NRC_M|_{M=1}^n = RC_M - \text{Minimum}(RC_M|_{M=1}^n)$$

Where $NRC_M$ is the normalized remaining charge of battery cell number M, n is the total number of battery cells of a battery cell stack, and $RC_M$ is the remaining charge of battery cell M as determined from the battery state of charge. Thus, routine 600 normalizes the state of charge of each battery cell of a battery cell stack by subtracting the lowest state of charge of all battery cells of the battery cell stack from the state of charge of each battery cell.

Routine 600 determines the average state of charge of the battery cells of a battery cell stack according to the following equation:

$$ARC = \frac{\sum_{M=1}^{n} NRC_M}{n}$$

Where ARC is the average remaining charge of all battery cells of a battery cell stack, n is the number of battery cells of a battery cell stack, and M is the battery cell number of a particular battery cell in a battery cell stack.

Routine 600 determines the battery cell charge adjustment from the average remaining charge according to the following equation:

$$ADC_M|_{M=1}^n = ARC - NRC_M$$

Where $ADC_M$ is the discharge cycle charge adjustment for battery cell M according to the latest discharge cycle. The discharge cycle adjustment is applied to a low pass filter of the form:

$$ADC_M|_{M=1}^n(\text{new}) = \alpha \cdot ADC_M + (1-\alpha) \cdot ADC_M(\text{old})$$

Where each new value of $ADC_M$ is determined from a previous value of $ADC_M$ and the value of $ADC_M$ as determined from the latest battery cell discharge cycle. The variable $\alpha$ is selected such that the discharge cycle adjustment changes fractionally over a number of discharge cycles. The secondary path charge rate $DC_M$ is adjusted according to the following equation:

$$DC_M(\text{new})|_{M=1}^n = DC_M(\text{old}) + ADC_M(\text{new})$$

Thus, the secondary path charge rate is a combination of the previous secondary path charge rate and the new secondary path charge rate adjustment. Charge is only supplied to series battery cells that have a corresponding positive value in array $DC_M$. No charge is added to battery cells that have a corresponding negative value in array $DC_M$. In this way, during a discharge cycle of a battery pack of a system as described by FIG. 5, a secondary charging path supplies charge to a lower charge capacity battery cell drawing charge from a plurality of battery cells of a battery cell stack, including the battery cell having a lower charge capacity, and increases the charge of the lower charge capacity battery cell. Such battery pack operation can extend battery operation during a battery discharge cycle. Routine 600 proceeds to 616 after updating array $DC_M$.

At 616, routine 600 starts the battery cell charging cycle. In one example, the charging cycle may be initiated by electrically coupling the battery pack to a charging source that is external of a vehicle. In another example, the BCM may initiate a charging cycle after a battery cell of a battery cell stack reaches a lower threshold voltage.

At 618, routine 600 determines the battery cell secondary path charging amount for a battery charging cycle according to the following equation:

$$CC_M|_{M=1}^n = \text{MAXIMUM}[DC_M|_{M=1}^N] - DC_M$$

Where $CC_M$ is the secondary path charge amount throughout the charge cycle. Thus, the secondary charge amount for battery cell M during a charge cycle is the maximum discharge amount of all battery cells of a battery cell stack minus the charge amount of battery cell M during a battery discharge cycle. Routine 600 proceeds to 620 after determining the secondary path charging for each battery cell during a charge cycle.

At 620, routine 600 monitors the primary path charge current and maintains the secondary path charge rate proportional to the primary path current for each battery cell according to array $CC_M$. The battery cell secondary current path charge equation for a battery cells indicates that battery cells that have a higher charge capacity are charged at a higher rate during a charging cycle as compared to other battery cells that have less charge capacity. Thus, during a charging cycle battery cells having a lower charge capacity may be charged by way of the primary charging path while battery cells that have a higher charge capacity are charged by way of the primary and secondary current paths. In this way, battery cells having different charge capacities can be charged simultaneously in a way that allows all the battery cells to substantially reach the fully charged state at the same time. Without such capability the battery would have to stop the charging cycle when the lower capacity battery cells reach a fully charged state, or charge would have to be removed from the lower capacity battery cells to a resistive load, for example.

Figure 8:
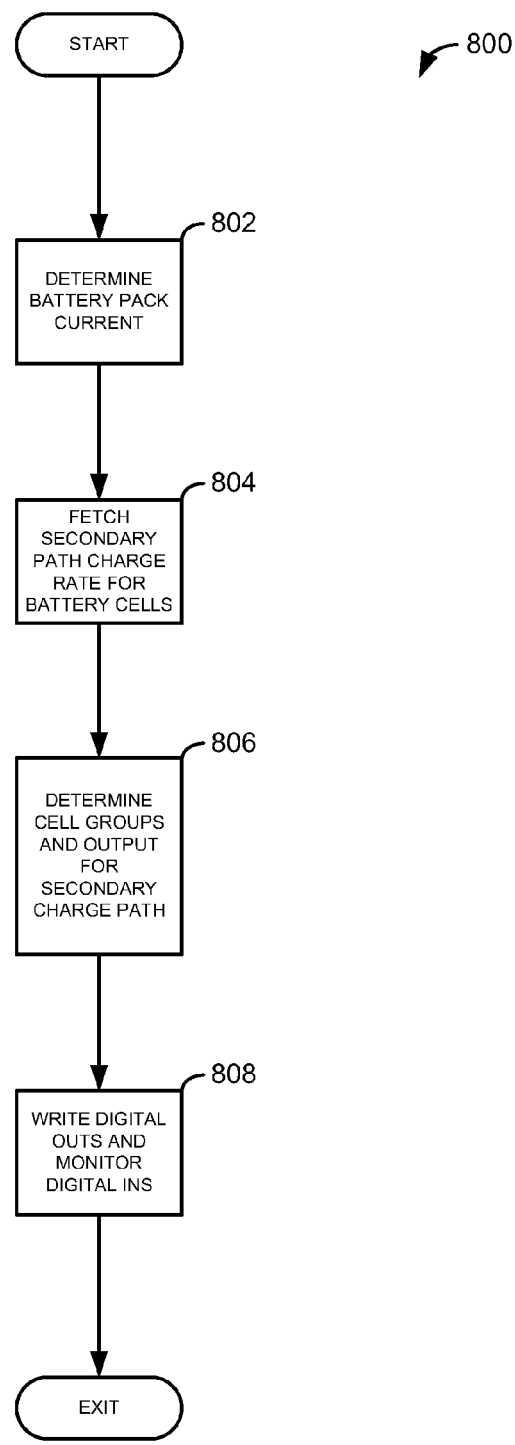
FIG. 8 shows a flow chart illustrating a method for maintaining secondary path charge proportional to battery pack current.

In one example, a number stored in the array $CC_M$ is multiplied by the primary current path current to determine a charge amount delivered to a battery cell by way of the secondary current path. As discussed above, the charge delivered to each battery cell in a battery cell stack by way of the secondary charging path may be individually controlled by varying a duty cycle or frequency applied to a transistor regulating current flow to a flyback transformer such as illustrated in FIGS. 5 and 8. In one example, the value obtained by multiplying the primary path current by contents of a location in array $CC_M$ is used to index a function that outputs a duty cycle to drive a transistor that regulates current flow to a flyback transformer that delivers charge to a battery cell in the battery cell stack.

In this way, during a battery charging cycle of a battery pack of a system as described by FIG. 5, a secondary charging path supplies charge to a higher charge capacity battery cell drawing charge from a plurality of battery cells of a battery cell stack, including the battery cell having a higher charge capacity, and increases the charge of the higher capacity battery cell. Routine 600 proceeds to 622 after charge supplied to all cells of the battery cell stack is adjusted according to values in array $CC_M$.

It should be mentioned that signals transferring charge to battery cells can be controlled so that all battery cells are not simultaneously charged. Thus, for example, if a plurality of flyback transformers are supplied a 5 us power pulse every 31 us, a first group of flyback transformers in the plurality of transformers may be supplied a power pulse in the first 10 us of the 31 us while a second group of flyback transformers is supplied a power pulse in the second 10 us of the 31 us time window.

At 622, routine 600 judges whether or not voltage of cell M ($CV_M$) is greater than an upper threshold voltage. In one example, the circuitry of FIG. 4 is switched in to determine a voltage of a battery cell of a battery cell stack. If the voltage of the battery cell is greater than a threshold voltage (e.g., the threshold voltage representing a fully charged battery cell), routine 600 proceeds to 626. Otherwise, routine 600 proceeds to 624. In another embodiment, a state of charge may be determined instead of a voltage, and if the state of charge is greater that a threshold state of charge, routine 600 proceeds to 626. Otherwise, routine 600 proceeds to 624.

At 624, routine 600 judges whether or not a discharge cycle of the battery has commenced. In one example, a discharge cycle may be initiated by an operator uncoupling a vehicle from a charging station. In another example, a discharge cycle may begin by an operator requesting vehicle movement. If a discharge cycle is started, routine 600 returns to 604. Otherwise, routine 600 returns to 620.

At 626, routine 600 determines the voltage of each battery cell in the battery cell stack and continues to charge battery cells that are at charge level less than a threshold charge. In particular, battery cells that are at a charge level that is less than an upper threshold charge continue to charge via the secondary current path until the battery cells reach the threshold voltage.

At 628, routine 600 judges whether or not all battery cells of a battery cell stack are at a desired charge threshold. In one example, the charge threshold is a full charge amount rating of a battery cell. In other examples, a charge threshold may be a predetermined amount of charge lower than a full charge amount rating of a battery cell. In one example, routine 600 assesses the battery cell charge of all battery cells in the battery cell stack by measuring the voltage of each battery cell with the circuitry described in FIG. 4. The charge of each battery cell is compared to the upper threshold charge, and if the battery cell charge is less than the threshold charge, the individual battery cell continues to receive charge via the secondary current path.

In this way, the battery controller uses the individual series battery cell voltage measurements and the primary and secondary current paths to bring the battery cell stack into balance. Consequently, all series battery cells arrive at the same upper charge level. Thus, during the battery charging cycle the secondary current path supplies charge to battery cells that have not reached an upper charge threshold. If routine 600 judges that a charge of each battery cell in the battery cell stack is greater than an upper charge threshold, routine 600 proceeds to 604. Otherwise, routine 600 proceeds to 630.

At 630, routine 600 judges whether or not a battery discharge cycle is started. In one example, a battery discharge cycle may be initiated by an operator of a vehicle disconnecting an external battery charging system from the battery pack. If a battery discharge cycle has started routine 600 returns to 604. Otherwise, routine 600 returns to 626.

Figure 7:
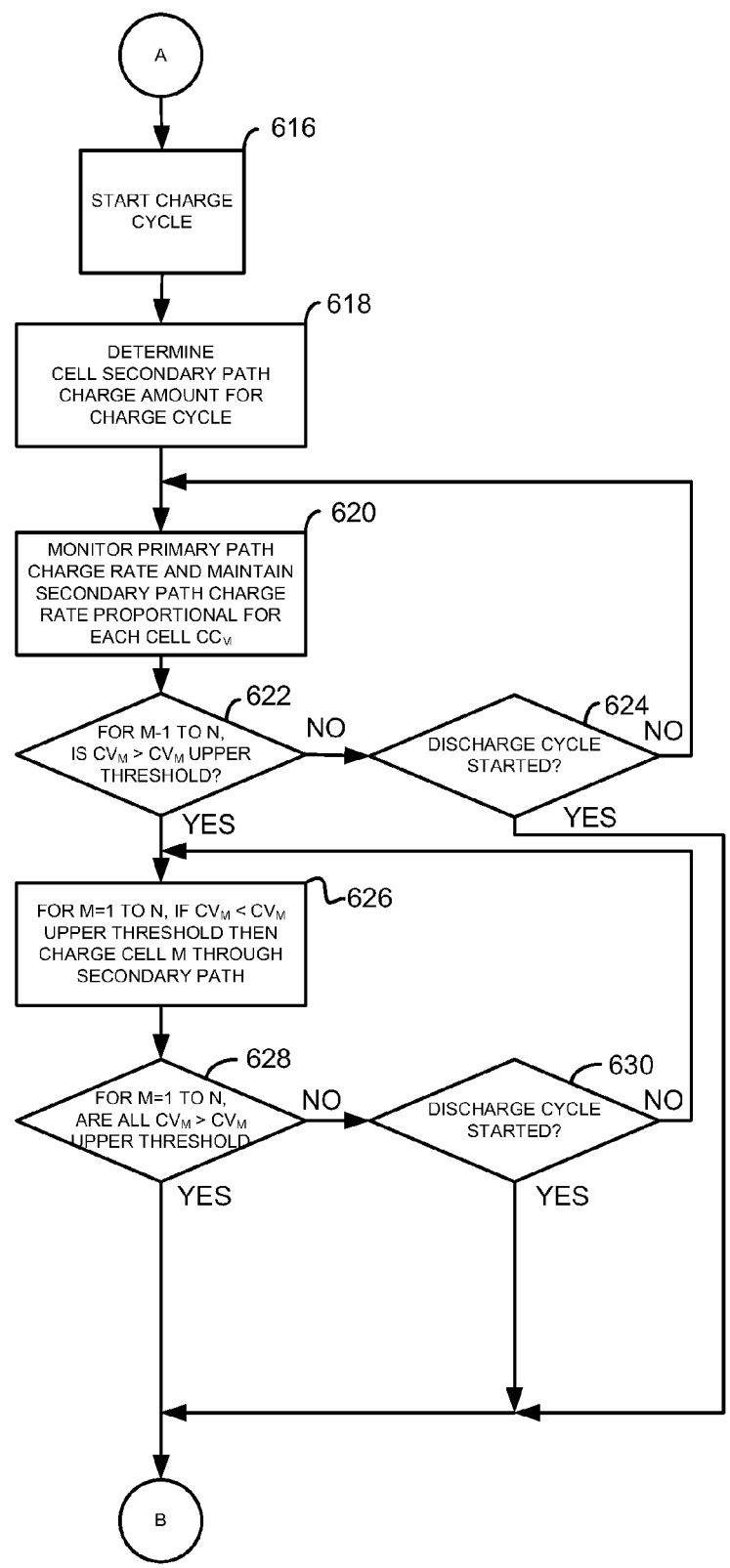
FIG. 7 shows a continuation of the flow chart illustrated in FIG. 6.

Thus, the method of FIGS. 6-7 controls charging of battery cells by way of a second current path in response to the net current in a first current path. So, for example, a battery pack that can provide 1000 amp hours of charge may be discharged to a level of 600 amp-hours of charge. Consequently, approximately 40% of the charge supplied to lower capacity battery cells would be delivered to the lower capacity battery cells during the same discharge period. If the battery is then charged to 650 amp-hours of charge, no additional charge is supplied to the lower capacity battery cells until the battery is discharged below the 600 amp-hour level. After the battery is at a level less than 600 amp-hours, charge is supplied to the battery cells in proportion to the current supplied by the battery.

It should be mentioned that while the method of FIGS. 6-7 is described with regard and in relation to a battery cell stack, the operations of FIGS. 6-7 may be performed with regard to a battery pack as well. In particular, the operations above describing a battery cell stack may be applied to a battery pack. For example, an array $DC_M$ may contain secondary path charge current for each cell of a battery pack. Thus, the array $DC_M$ may contain secondary path charge current for several battery cell stacks. Accordingly, the array $DC_M$ may be updated by normalizing the remaining charge of each battery cell with the battery cell of the battery pack that has the lowest level of charge at the end of a battery discharge cycle.

Referring now to FIG. 8, a flow chart illustrating a method for maintaining secondary path charge proportional to battery pack current is shown. Routine 800 begins at 802 where battery pack current is determined. In one example, the battery pack current is determined from a current shunt circuit. Routine 800 proceeds to 804 after battery pack current is determined.

At 804, routine 800 fetches secondary path charging rates for battery cells. In one example, secondary path charging rates are fetched from a routine that controls battery cell charge, the method of FIGS. 6-7 for example. In particular, the secondary path charge amount for each battery cells during a discharge cycle is retrieved from array $DC_M$. Alternatively, if the battery is in a charging cycle, the secondary path charge amount is retrieved from array $CC_M$. Routine 800 proceeds to 806 after charging rates are retrieved.

Figure 11:
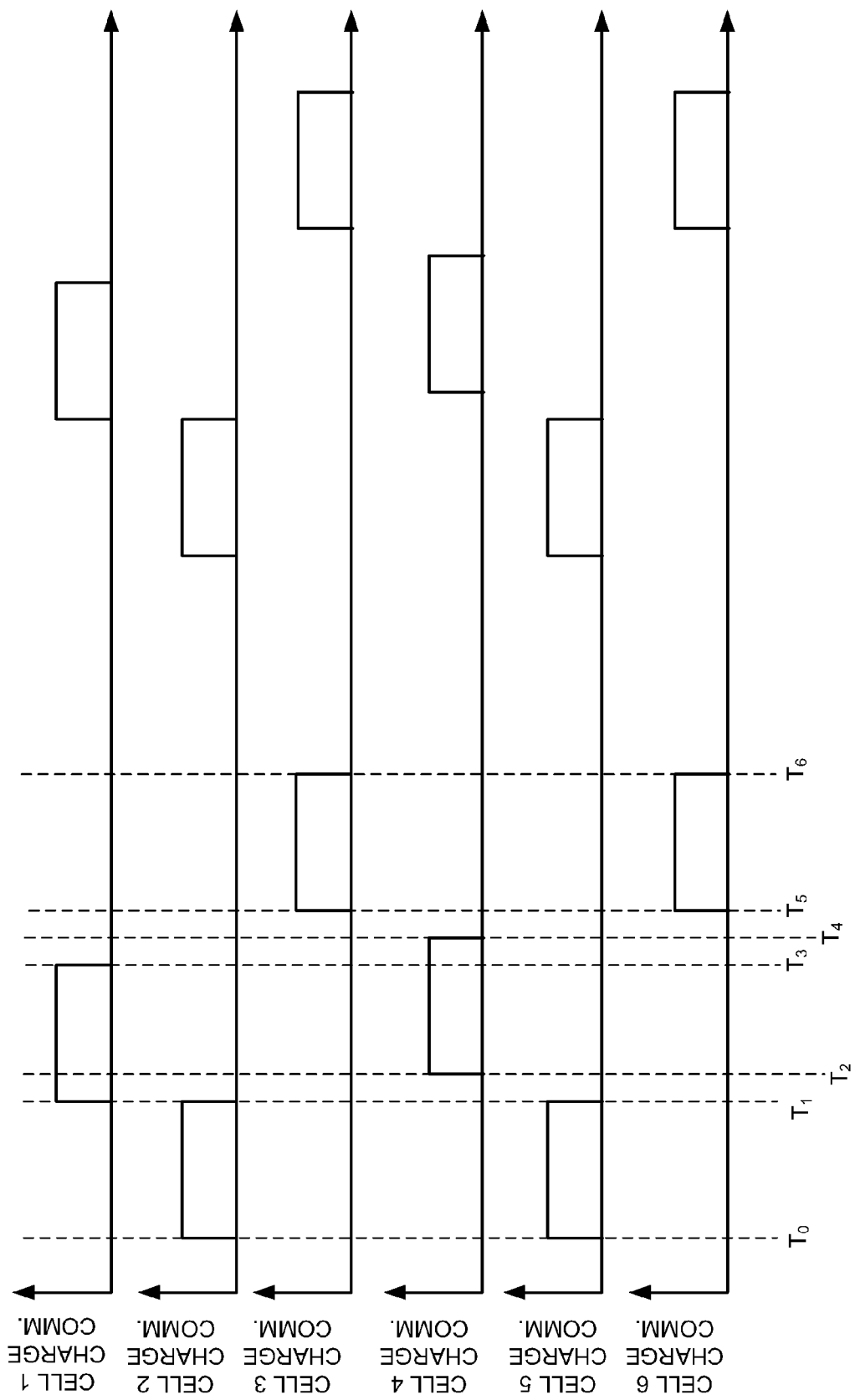
FIG. 11 shows a schematic diagram of simulated electrical signals for charging a group of battery cells.

At 806, routine 800 determines cell groups and charging signal timings for controlling flyback transformers in a secondary current path. In particular, the outputs of the microcontroller that are associated with cells of arrays $DC_M$ and $CC_M$ having positive values are activated during battery charging and discharging cycles. The amount of charge delivered to a battery cell is adjusted by controlling the on-time or pulse duration of a digital output supplied by a microcontroller. In addition, different battery cells may be charged at different rates at different times as illustrated in FIGS. 10-11 by adjusting the timing of digital outputs of the microcontroller.

In one example, the values stored in $DC_M$ and $CC_M$ are input to a stored function or instruction that relates a battery cell charge rate to a flyback transformer pulse duration. The pulse duration is output by the microcontroller by setting and re-setting digital outputs during a timing window (e.g., see FIGS. 9-11). For example, the pulse is started by turning on the digital output and the pulse is stopped by turning off the digital output. Pulse timing is controlled with respect to microcontroller instruction time and the desired battery cell charge rate.

The digital outputs are assembled into groups (e.g., see FIGS. 9-10) because digital inputs and outputs are read or written by operations involving a digital word or byte. Thus, several digital inputs and outputs may be simultaneously controlled. The groups of digital inputs and outputs operated upon during a particular microcontroller timing window may be defined according to system architecture and battery cell charging requirements. For example, eight digital outputs may be configured to operate flyback transformers 1-8 on an MBB. All eight digital outputs can be set to a value of 1 if it is determined that all eight battery cells require charge. Alternatively, six of the eight bits may be set when only six battery cells are to be charged. Further, by writing multiple times to a digital output port on the microcontroller it is possible to phase the order in which digital outputs are activated and deactivated. Battery cells that require charge during a microcontroller timing window can be determined by finding which elements or cells of arrays $DC_M$ and $CC_M$ have positive values, the battery cell that corresponds to the cell location in array $DC_M$ or $CC_M$ is the battery cell requiring charge. Further, a particular cell of array $DC_M$ is mapped to a particular group of digital bits so that the appropriate flyback transformer is activated during battery charging and discharging cycles. Routine Routine 800 proceeds to 808.

At 808, digital outputs and inputs are written to and read from. In one example, a group of digital outputs are written simultaneously. Further, a group of digital inputs related to the states of flyback transformers is read simultaneously. The digital input and outputs may be controlled so as to vary the timing and duration of charge provided to flyback transformers (e.g., see FIGS. 9-11). Routine 800 proceeds to exit after digital inputs are read and after digital outputs are written.

Thus, the methods of FIGS. 6-8 provide for a method for extending a useable capacity of a battery pack, comprising: discharging a battery cell via a first current path during a battery discharge cycle; and charging said battery cell via a second current path during said battery discharge cycle. The method including wherein said battery cell and said plurality of battery cells comprise a battery cell stack and where said charging of said battery cell is in proportion to an amount of current provided by said battery pack to a load external to said battery pack. The method including wherein said battery cell is charged with charge from a plurality of battery cells of said battery pack. The method including wherein said battery cell is charged by an output of a DC/DC converter. The method including wherein said battery cell is charged at a rate related to an average charge of other battery cells comprising said plurality of battery cells. The method including wherein charging of said battery cell is regulated by a variable conductance switch. The method including wherein said variable conductance switch is a field effect transistor.

Further, the methods of FIGS. 6-8 provide for a method for extending a useable capacity of a battery pack, comprising: discharging a plurality of battery cells through a first current path during a battery discharge cycle; stopping said battery discharge cycle when a voltage of a battery cell of said plurality of battery cells is less than a threshold; charging said plurality of battery cells during a battery charging cycle, said plurality of batteries charged through said first current path; and charging at least one of said plurality of battery cells through a second current path during said battery charging cycle. The method including wherein said second current path includes at least one variable conductance switch, and where said stopping includes stopping said battery discharge cycle when a voltage of any of said plurality of battery cells is less than the threshold, and where said charging at least one of said plurality of battery cells through said second current path during said battery charging cycle includes charging less than all of said plurality of battery cells. The method including further comprising stopping to charge said plurality of battery cells through said first current path during a condition and supplying current from said first current path to said second current path to charge at least one battery cell of said plurality of battery cells. The method including wherein said condition is at least one battery cell at a threshold voltage. The method including wherein said first current path includes said plurality of battery cells.

Referring now to FIG. 9 a schematic view of a microcontroller time slice is shown. A time slice or window is represented by leader 900 and it stretches from the left arrow to the right arrow. In one example, timing of outputs of a microcontroller of an MBB is related to the physical characteristics of the flyback transformers. For example, timing of electrical signals is in response, at least in part, to coil charging saturation time, magnetic field collapse time, or a number of turns in a primary or secondary coil winding. The microcontroller inputs and outputs (e.g., digital inputs and outputs) are serviced by control routines that activate and deactivate current supplied to flyback coils at a rate that is faster than the flyback transformer physical characteristics so that charge transferred through the flyback transformers may be controlled. In the example of FIG. 9, writing to microcontroller ports is controlled according to a 31 us timing window, the 31 us based on a flyback coil charging saturation time. In other examples, the timing of digital inputs and outputs is based on longer or shorter timing windows. Thus, the microcontroller can change the state of digital outputs so that the flyback transformers do not have time to saturate when a digital output is activated.

The timing window of FIG. 9 is broken up into smaller blocks of time 904, 906, 908, and 910. The smaller blocks of time can be set according to a flyback transformer upper pulse width duration limit (e.g., a pulse width that saturates the coil). In this way, the timing block duration is related to the rate that charge is transferred by flyback transformers in the secondary current path. In the example of FIG. 9, blocks 904, 906, and 908 represent 8.5 us of time where digital inputs and outputs may be read or written. Block 910 represents a 5.5 us block of time for checking functions of the microcontroller. Each block is further divided into subdivisions 902 that represent timing for executing instructions. Thus, a plurality of instructions may be executed during the timing of cell group 1 timing 904.

Referring now to FIG. 10, a table of example instructions for charging a group of battery cells is shown. The numbers 1010 arranged horizontally across table 1000 represent instructions during the time allotted to a cell group (e.g., 904 of FIG. 9). The pulse width numbers at the right side of table 1000 represent the pulse width available with the instructions to the left of the pulse width. The pulse widths in this example range from 3 us to 8.5 us, however, other pulse durations are possible.

The letters A, B, C, and D in table 1000 refer to microcontroller port designations. Ports A and B are digital input ports while ports C and D are digital output ports. Instruction ON D at 1002 sets selected bits within port D to a state of 1. Instruction ON C at 1004 sets selected bits within port C to a state of 1. Instruction MON B & EVAL at 1006 refers to reading inputs of port B and evaluating whether or not current was supplied to selected flyback transformers. MON A & EVAL at 1008 refers to reading inputs of port A and evaluating whether or not current was supplied to selected flyback transformers. Instruction OFF refers to setting outputs in a state of 1 to a state of 0. Instruction nop refers to no operation during the time period. Thus, by selectively grouping digital inputs and outputs, and timing the control of the inputs and outputs, a range of charge can be supplied to battery cells of a battery cell stack by way of a secondary current path.

Referring now to FIG. 11 a schematic diagram of electrical signals for charging a group of battery cells is shown. The X-axis of each plot represents time, and time increases from left to right. The Y-axis of each plot represents voltage applied to a primary coil of a flyback transformer, the flyback transformer charging a battery cell (e.g., the flyback transformers of FIG. 5). A higher level indicates voltage is being applied to the primary side of a flyback transformer to charge a battery cell. In this example, battery cells 2 and 5 may be in a first group of battery cells, battery cells 1 and 4 in a second group of battery cells, and battery cells 3 and 6 in a third group of battery cells, the groups of battery cells based on the groupings of FIGS. 9-10.

The charging of a plurality of battery cells may be accomplished by the system of FIG. 5 and by method of FIGS. 6-8 according to the timings illustrated by FIG. 11. By charging battery cells according to the timings of FIG. 11, it is possible to reduce DC/DC converter ripple. Further, charging battery cells according to the timing of FIG. 11 reduces the total current drawn simultaneously from a DC/DC converter. Therefore, the size of the DC/DC converter may be reduced.

At time $T_0$, a voltage is supplied to flyback transformers supplying charge to battery cell numbers 2 and 5. When voltage is supplied to a flyback transformer a magnetic field develops within the flyback transformer. In the example of FIG. 11, a voltage is supplied to two flyback transformers although voltage may be supplied to more or fewer transformers if desired.

At time $T_1$, the voltage applied at $T_0$ is removed from flyback transformers supplying charge to battery cell numbers 2 and 5. When voltage is removed from a flyback transformer the magnetic field collapses and charge is supplied to battery cell numbers 2 and 5. In addition, a voltage is applied to a flyback transformer supplying charge to battery cell number 1. Shortly thereafter at $T_2$, a voltage is applied to a flyback transformer supplying charge to battery cell number 4. Thus, the time voltage is applied to battery cell numbers 1 and 4 within a group of battery cells is varied. In this way, it is possible to vary the timing at which voltage is supplied to battery cells within a group of digital outputs. Further, by adjusting the timing of flyback transformer control pulses current flow is adjusted so that current is not simultaneously rushing into all flyback transformers. At times $T_3$ and $T_4$, voltage is removed from flyback transformers supplying charge to battery cell numbers 1 and 4.

At time $T_5$, a voltage is supplied to flyback transformers supplying charge to battery cell numbers 3 and 6. The time voltage is supplied to flyback transformers supplying charge to battery cell numbers 3 and 6 occurs after the time when voltage is applied to battery cell numbers 1, 2, 4, and 5. Thus, the current supplied by a DC/DC power supply to battery cells is distributed over time so that instantaneous current demand is reduced. Further, by spreading the load of charging battery cells over a time interval, ripple on the DC/DC converter output is reduced. At $T_6$, voltage is removed from flyback transformers supplying charge to battery cell numbers 3 and 6, and then the charging cycle repeats when voltage is applied to flyback transformers supplying charge to battery cell numbers 2 and 5.

It should be noted that additional or fewer battery cells than are shown in FIG. 11 may be charged during a battery cell charging cycle. In addition, charge to a particular battery cell may be discontinued during charging of a battery cell via the secondary current path when the battery cell reaches a desired level of charge. In this way, the systems and methods described herein allow targeted charging of battery cells, and the charging can start and stop according to the state of charge of a battery cell.

Figure 12:
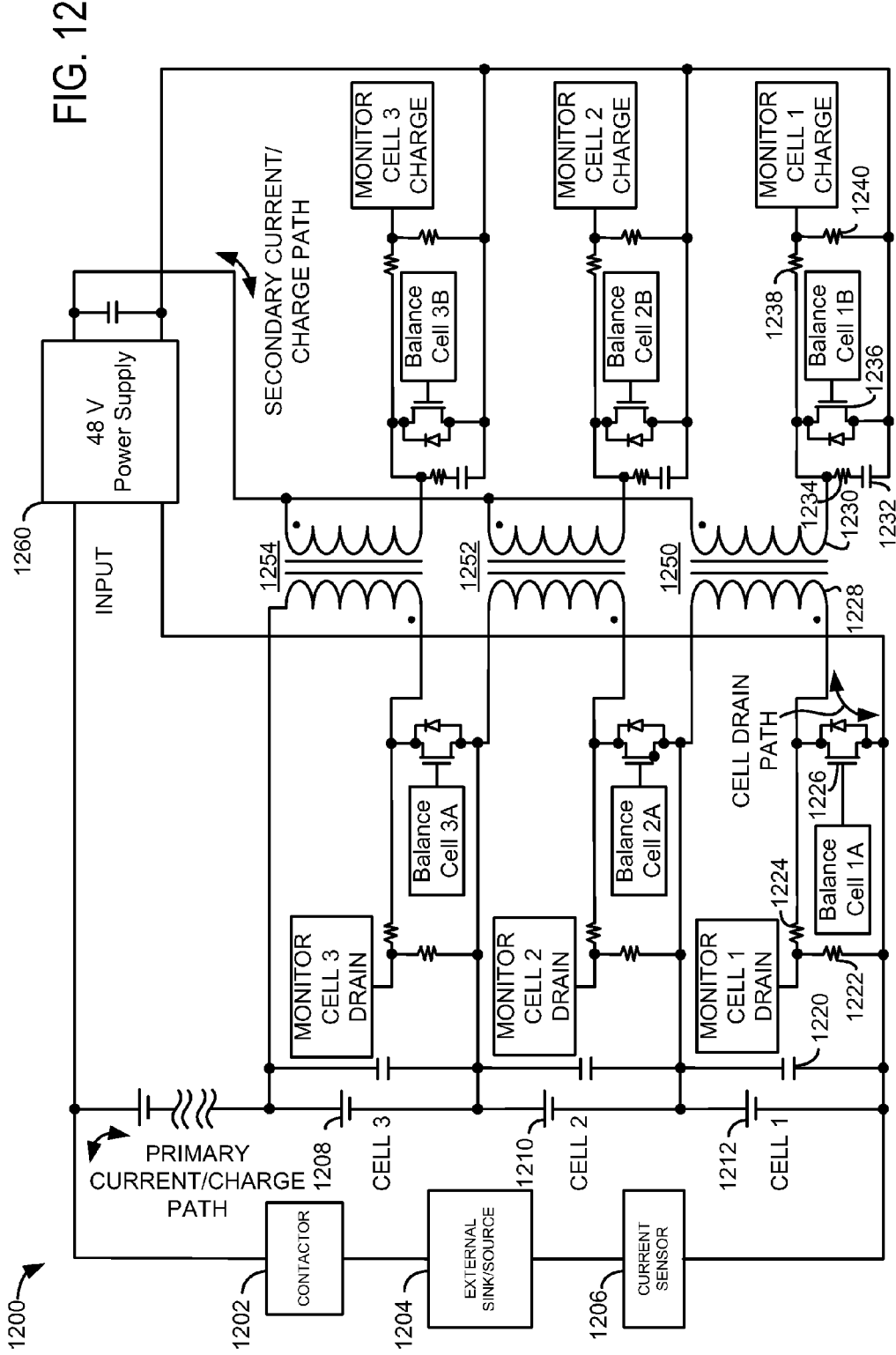
FIG. 12 shows a schematic diagram of circuitry for actively balancing and charging a battery cell.

Referring now to FIG. 12, a schematic diagram for actively balancing and charging a battery cell is shown. The circuitry illustrated in FIG. 12 is similar to that shown in FIG. 5. However, the circuitry of FIG. 12 includes switching transistors on the battery cell side of the flyback transformers so that power may be drained from battery cells through the same flyback transformer that may supply charge to the battery cell. Thus, flyback transformers may be used to charge and/or discharge battery cells in response to battery cell and battery pack operating conditions. Further, a first flyback transformer may draw charge from a first battery cell while a second flyback transformer may supply charge to a second battery cell, the second flyback transformer supplied charge from the first flyback transformer. In this way, charge may be shuttled between battery cells by way of the secondary current path.

Circuit 1200 shows active balancing circuitry for three battery cells although the circuitry is applicable for additional or fewer battery cells as indicated by the break in between battery cells connection near the top of FIG. 12. Battery cells 1212, 1210, and 1208 are shown coupled in series, however, additional battery cells may be coupled in parallel to the illustrated battery cells though each series battery cell should be coupled to an equivalent number of battery cells as other series battery cells. Battery cells coupled in parallel with battery cells 1212, 1210, and 1208 do not affect the active balancing circuitry, but parallel battery cells do change the charge capacity and therefore may affect the amount of current that may be sourced or sunk. Battery cells 1212, 1210, and 1208 act through contactor 1202 to sink and/or source current to loads or sources that are external to the battery pack. Current flowing between battery cells 1212, 1210, and 1208 and sink/source 1204 is monitored by current sensor 1206. In one embodiment, the path current flows between battery cells and the external sink/source may be referred to as the primary current path. The path current flows from battery cells through a power supply or a power storage device (e.g., capacitor) and the flyback transformers may be referred to as the secondary current path. And, the path current flows from battery cells to flyback transformers may be referred to as the battery cell drain current path.

As illustrated, power supply 1260 is supplied power by all battery cells in the battery cell stack. Alternatively, a capacitor may be substituted for power supply 1260. If a capacitor is substituted for power supply 1260, the capacitor is coupled only to the secondary current path and not the primary current path. As illustrated, power supply 1260 can drain current equally from battery cells 1212, 1210, and 1208. In this way, power supply 1260 is configured so as to reduce imbalance between battery cells of a battery cell stack. Power from power supply 1260 is routed to one side of flyback transformers 1250, 1252, and 1254.

In an alternative embodiment where a total module voltage is in a range of 36 volts to 48 volts, the flyback primaries of one module can be supplied power by directly connecting the flyback primaries to the output terminals of a different module. For example, the flyback primaries of the MBB on module number two are supplied power from the voltage output terminals of module number one. Module number three flyback primaries are supplied power from the voltage output terminals of module number two, and module number one flyback primaries are supplied power from the voltage output terminals of module number three.

Flyback transformer 1250 can transfer charge from primary coil 1230 to secondary coil 1228 when current flow is switched on and off through FET 1236. Charge is stored in a magnetic field produced by primary coil 1230 when current flows through primary 1230. Charge is transferred to secondary coil 1228 when current flow in primary coil 1230 is stopped which causes the magnetic field to collapse. The collapsing magnetic field induces a current in the secondary coil 1228 and allows a battery cell to be charged. In one example, FET 1236 is switched on and off at a rate of 32 KHz. FET 1236 conducts when a voltage is applied to the gate of FET 1236. A microcontroller on the MBB may be configured to turn FET 1236 on and off by changing the state of a digital output. FET 1226 is held in an off state when FET 1236 is switching. An intrinsic diode in FET 1226 allows current to flow through coil 1228 and charge battery cell 1212 when FET 1226 is not activated. A snubber circuit comprising capacitor 1232 and resistor 1234 reduces voltage produced when current flow through flyback transformer 1250 is stopped. Capacitor 1220 acts to smooth voltage provided from flyback transformer 1250 to battery cell 1212.

Flyback transformer 1250 can also transfer power from battery cell 1212 to primary coil 1230 when current flow is switched on and off through FET 1226. When FET 1226 is switching FET 1236 is held in an off state. The charge transferred from battery cell 1212 to flyback transformer 1250 is made available to flyback transformers 1252 and 1254 via a conductor coupling flyback transformer 1250 to flyback transformers 1252 and 1254.

Battery cell charging is monitored by sensing a voltage that develops between resistors 1238 and 1240. Resistors 1238 and 1240 are coupled to one side of primary coil 1230. In one embodiment, a voltage that develops between resistors 1238 and 1240 is monitored by a digital input of the microcontroller on the MBB to determine charging of a battery cell. In another embodiment, the voltage that develops between resistors 1238 and 1240 may be monitored by an analog input. Battery cell discharging is monitored by sensing a voltage that develops between resistors 1224 and 1222. Resistors 1224 and 1222 are coupled to one side of secondary coil 1228. In one embodiment, a voltage that develops between resistors 1224 and 1222 is monitored by a digital input of the microcontroller on the MBB to determine discharging of battery cell 1212. In an alternative embodiment, the voltage that develops between resistors 1224 and 1222 is monitored by an analog input.

In one embodiment where a capacitor is substituted for power supply 1260, the amount of charge stored in the capacitor may be adjusted by varying the duty cycle of transistors 1226 and 1236. For example, if battery cell 1212 is discharged into the capacitor, the duty cycle of transistor 1226 can be varied to increase or decrease the amount of charge supplied to the capacitor. During such operation transistor 1236 is off. On the other hand, when battery cell 1212 is charging by way of the secondary current path, the duty cycle of transistor 1236 can be varied to increase or decrease the amount of charge supplied by the capacitor to battery cell 1212. When battery cell 1212 is charging by way of the secondary current path, transistor 1226 is off. In addition, FETs on the primary side of one flyback transformer may be switched while FETs on the secondary side of another flyback transformer are switched such that charge is simultaneously sourced to and drained from the capacitor. In this way, the capacitor acts as an intermediate charge storage device so that the amount of current entering the capacitor does not have to exactly equal the amount of current supplied by the capacitor. Rather, the charge over a period of time in the secondary current path may be zero.

Thus, FIG. 12 provides for a system for actively balancing battery cells of a battery pack, comprising: a plurality of battery cells; a first current path for charging and discharging said plurality of battery cells external said battery pack; a second current path for charging and discharging battery cells during a battery pack discharge cycle; and a controller, said controller including instructions for supplying a first charge to a first flyback transformer and a second charge to a second flyback transformer, said first and second flyback transformers in said second current path. The system including wherein said controller includes further instructions for supplying said first charge and said second charge at different timings. The system including wherein first flyback transformer supplies charge to a first battery cell and wherein said second flyback transformer supplies charge to a second battery cell. The system further comprising a third flyback transformer. The system including wherein said controller includes further instructions for drawing charge from a third battery cell via said third flyback transformer. The system including wherein said battery cells are lithium-ion battery cells. The system including wherein said controller includes instructions for supplying charge to a first group of flyback transformers, said first group of flyback transformers including said first flyback transformer, and wherein said controller includes instructions for supplying charge to a second group of flyback transformers, said second group of flyback transformers including said second flyback transformer. The system further comprising a first switch and a second switch, said first switch electrically coupled to a secondary coil of said first flyback transformer and said second switch electrically coupled to a secondary coil of said second flyback transformer.

Figure 13:
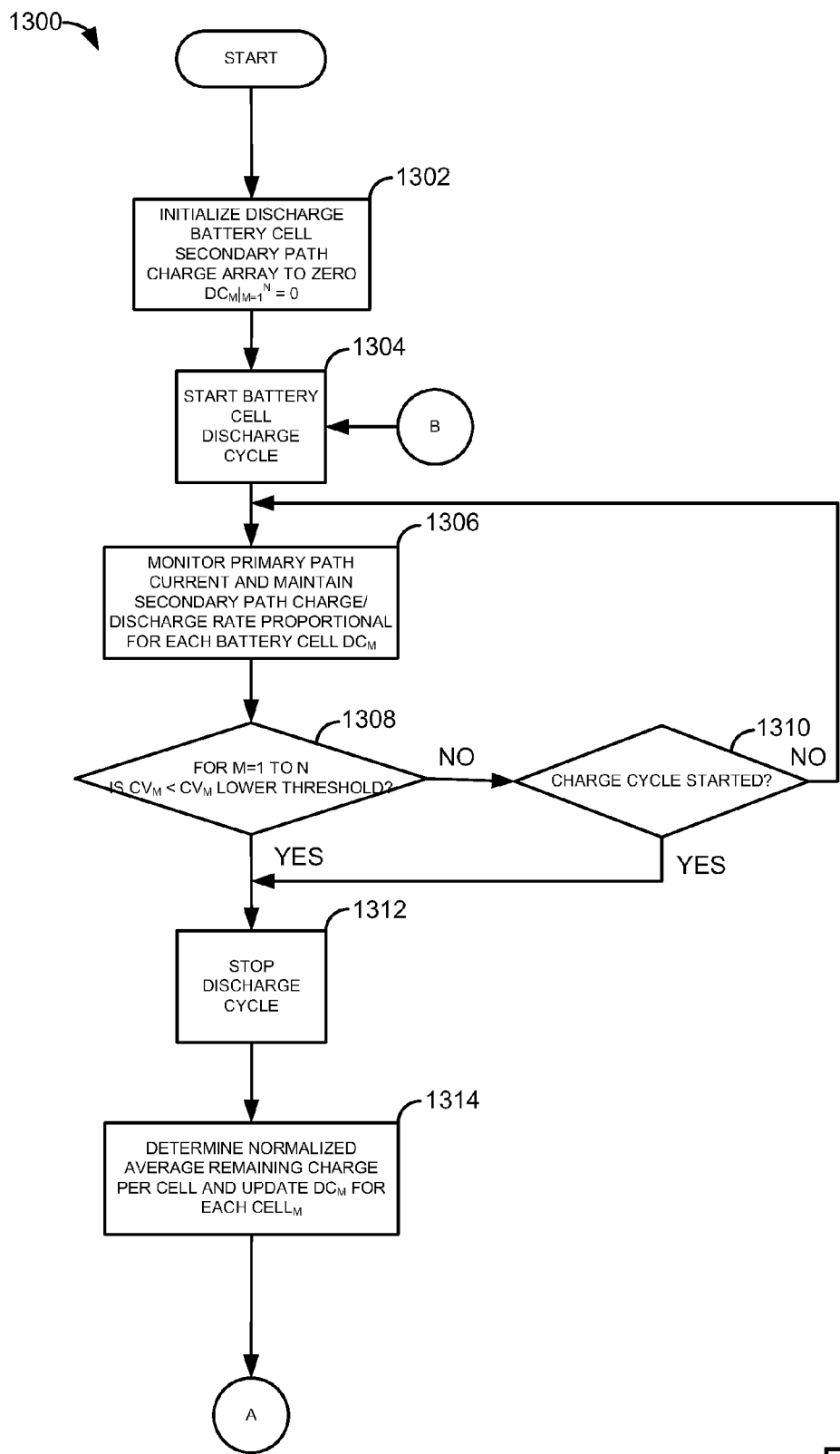
FIG. 13 shows a flow chart illustrating a method for controlling battery cell state of charge.

Referring now to FIG. 13, a flow chart of a method for controlling battery cell state of charge is illustrated. A system as described by FIG. 12 can charge and discharge battery cells by way of two different current paths. The first path may be referred to as the primary path. The primary path allows current to flow into or out of the battery pack to charge and discharge battery cells. The secondary current path is a path where battery cells within the battery pack may provide charge to or receive charge from other battery cells within the battery pack. FIG. 12 shows an example of a primary current path and a secondary current path. In a second embodiment, the second current path may only be coupled to the primary current path by way of flyback transformers. In such an embodiment, a capacitor may be electrically coupled to the flyback transformer in the secondary current path.

At 1302, an array that contains the amount of charge to be applied to the individual cells of a battery cell stack is initialized to zero. In one embodiment, the array is called DC and it contains values that represent the secondary path charge amount that each battery cell receives during a discharge cycle. In one example, the units of DC are coulombs per amp of net battery pack current delivered to an external load, where net battery current is total battery current delivered minus battery current received during a discharge cycle. The array may be indexed as $DC_M$ where M is the battery cell number in the battery cell stack. The initialization operation may be described mathematically as $DC_M|_{M=1}^{N}=0$ where M is the individual battery cell number and N is the total number of cells. Thus, when a battery pack is new and has not been discharged, no current is provided to battery cells by way of the second current path. After the battery pack has completed a discharge cycle, the array DC may be updated so as to provide current to battery cells that reach a lower charge threshold before other battery cells in the battery cell stack. Routine 1300 proceeds to 1304 after the secondary current path charge array is initialized.

In one example, a battery discharge cycle may be a period of time a battery cell is not in electrical communication with a charger that is external to a vehicle. Thus, in one example, a battery may be in a charging cycle when the battery is coupled to a charger that is external to a vehicle. Then, when the battery is uncoupled from the charger and provides current to propel the vehicle the battery is in a discharge cycle. Further, the battery may receive current from the vehicle during vehicle deceleration, and although the battery is sourcing and sinking current to operate the vehicle, it remains in a discharge cycle. Once the battery is electrically re-coupled to the charger it enters a charge cycle whether or not the battery was fully discharged during the discharge cycle. In other examples, a discharge cycle may be defined differently. For example, a discharge cycle may be defined as a period when the battery is supplying charge. Thus, during a driving cycle a battery may enter a plurality of discharge cycles.

At 1304, the battery discharge cycle begins. In one example, the battery discharge cycle is initiated when the battery is decoupled from a charging unit. In other examples, the discharge cycle may be initiated when a driver makes a request to operate a vehicle and an electrical load is electrically coupled to the battery. In one example, the battery pack reaches the end of a discharge cycle when one or more of the battery cells in the battery pack reaches a lower charge threshold.

At 1306, routine 1300 monitors the discharge current in the primary current path and maintains a charge and discharge rate in the secondary path proportional to the primary path current for each battery cell $DC_M$ (e.g., battery cell M in the discharge array DC). For example, for a battery cell M, the charge delivered by way of the secondary current path during a battery discharge cycle is $I_{NET}$ multiplied by $DC_M$. Where $I_{NET}$ is the net battery current and $DC_M$ is the secondary path charge amount for battery cell M during a discharge cycle. The discharge of battery cells of a battery pack may be monitored by way of a current sensor. For example, current sensor 1206 of FIG. 12 may be used to determine the battery pack and battery cell stack discharge rate.

In one embodiment, the secondary path charging rate of each battery cell requesting charge during a discharge is delivered to the assigned battery cell by switching a transistor on the primary side of a flyback coil. Battery cells requesting charge during a discharge cycle are indicated by a numeric value in the corresponding locations of array DC. For example, transistor 1236 can be switched to transfer current from 48 volt power supply 1260 to cell 1 of FIG. 12. In one example, transistor 1236 is switched by a signal that is at a substantially constant frequency (e.g., 32 kHz). The duty cycle (e.g., the portion of a period of a cycle that a signal is in a high state) of the signal may be varied to adjust the rate at which current is delivered to the battery cell. For example, the 32 kHz signal having a 5% duty cycle provides a lower amount of current to charge a battery cell than does a 20% duty cycle. The numeric value contained in array DC may be input into a function that relates the secondary path charge amount to a duty cycle. For example, a charge rate of X coulombs per amp of net current may correspond to a 20% duty cycle. Thus, a voltage applied to the primary side of flyback transformer 1250 can be switched at different duty cycles to control the charging of battery cell 1. In other embodiments, the switching frequency of transistor 1236 may be varied to adjust charging of battery cell 1. Further, timing of battery cell charging may be carried out as discussed with reference to FIGS. 15-16.

At 1308, routine 1300 judges whether or not one or more of the cells of the battery cell stack are at a voltage that is less than a lower threshold voltage. In one example, a plurality of networks as shown in FIG. 4 are selectively coupled to battery cells to determine the voltage of battery cells in a battery cell stack. In other embodiments, battery state of charge may be substituted for battery voltage so that routine 1300 moves from 1308 to 1312 or 1310 based on whether or not battery cell state of charge is less than a lower threshold state of charge. If one or more battery cells of the battery cell stack is below the lower threshold, routine 1300 proceeds to 1312. Otherwise, routine 1300 proceeds to 1310.

At 1310, routine 1300 judges whether or not a battery cell stack has entered a charging cycle. In one example, a charging cycle is initiated by an operator plugging a vehicle into a charger external from the vehicle. In another example, a charging cycle may be initiated when the battery is receiving current from external the battery pack. If routine 1300 judges that a charging cycle has started, routine 1300 proceeds to 1312. Otherwise, routine 1300 returns to 1306.

At 1312, routine 1300 stops the battery cell discharge cycle. In one example, the battery discharge cycle is stopped by sending a status signal to the vehicle controller. Further, the battery output contactors may be set to an open state during a charging cycle. Routine 1300 proceeds to 1314 after the discharge cycle is stopped.

At 1314, routine 1300 updates the $DC_M$ array. After the discharge cycle is completed routine 1300 determines adjustments to the $DC_M$ array. In some embodiments, the $DC_M$ array is not updated unless a threshold level of charge has been drawn from the battery pack. For example, in one embodiment the $DC_M$ array is not updated unless more than 20% of the battery pack charge is drawn from the battery pack. Further, the threshold level of charge at which the $DC_M$ is updated may vary depending on battery pack operating conditions. For example, array $DC_M$ may be updated when less charge has been drawn at higher battery temperatures.

Routine 1300 determines updates to the $DC_M$ array in response to the state of charge of each battery cell of a battery cell stack after the discharge cycle is complete. Battery cell state of charge may be determined as discussed above with reference to FIGS. 6-7. Routine 1300 also determines the minimum charge remaining on the battery cells of the battery cell stack. In particular, routine 1300 compares the charge of each battery cell of the battery cell stack and selects the lowest level of charge.

Routine 1300 determines a normalized remaining charge for each battery cell of the battery cell stack as discussed above with reference to FIGS. 6-7. Thus, routine 1300 normalizes the state of charge of each battery cell of a battery cell stack by subtracting the lowest state of charge of all battery cells of the battery cell stack from the state of charge of each battery cell.

Routine 1300 determines the average state of charge of the battery cells of a battery cell stack, the battery cell charge adjustment, the discharge cycle adjustment applied to a low pass filter, and the secondary path charge rate $DC_M$ as discussed above with reference to FIGS. 6-7. Thus, the secondary path charge rate is a combination of the previous secondary path charge rate and the new secondary path charge rate adjustment. Charge is only supplied to series battery cells that have a corresponding positive value in array $DC_M$. Charge is removed from battery cells that have a corresponding negative value in array $DC_M$. In this way, during a discharge cycle of a battery pack of a system as described by FIG. 12, a secondary charging path supplies and draws charge to and from individual battery cells in proportion to the current flowing in the primary current path. In one embodiment, the charge balance between charge supplied and charge removed from battery cells by way of the secondary charge/discurrent path is maintained to a net charge of zero. However, since the number of coil turns on the primary side of the flyback transformer may differ from the number of coil turns on the secondary side of the flyback transformer, the frequency and/or duty cycle of signals operating transistors on the primary and secondary sides of the flyback transformers may be different. For example, if a first flyback transformer is operated at a first frequency and duty cycle to drain charge from a first battery cell during a charging cycle, a second flyback transformer can be operated at a second frequency and duty cycle to add charge to a second battery cell during the same charging cycle. Consequently, charge can be drawn from a lower charge capacity battery cell and be delivered to a higher capacity battery cell via the secondary current path and flyback transformers. Such battery pack operation can reduce the size of the DC/DC converter or capacitor in the secondary current path. Routine 1300 proceeds to 1316 after updating array $DC_M$.

At 1316, routine 1300 starts the battery cell charging cycle. In one example, the charging cycle may be initiated by electrically coupling the battery pack to a charging source that is external of a vehicle. In another example, the BCM may initiate a charging cycle after a battery cell of a battery cell stack reaches a lower threshold voltage.

At 1318, routine 1300 determines the battery cell secondary path charging and discharging current during a charging cycle. In one example, the sum of charge transferred between battery cells of a battery cell stack is set equal to zero. In particular, proportional adjustments are made to the amount of charge removed from battery cells that where supplied charge during a discharge cycle (e.g., battery cells having a corresponding positive value stored in $DC_M$). Further, charge delivered during a charging cycle $CC_M$ is determined from the negative of $DC_M$. If the difference between charge supplied and charge removed between battery cells is tending positive, then the charge removed from each battery cell having charge removed is proportionally increased. If the difference between charge supplied and charge removed between battery cells is tending negative, then the charge removed from each battery cell having charge removed is proportionally decreased.

At 1320, routine 1300 judges whether or not voltage of cell M ($CV_M$) is greater than an upper threshold voltage. In one example, the circuitry of FIG. 4 is activated to determine a voltage of a battery cell of a battery cell stack. If the voltage of a battery cell is greater than a threshold voltage (e.g., the threshold voltage representing a fully charged battery cell), routine 1300 proceeds to 1324. Otherwise, routine 1300 proceeds to 1322.

At 1322, routine 1300 judges whether or not a discharge cycle of the battery has commenced. In one example, a discharge cycle may be initiated by an operator uncoupling a vehicle from a charging station. In another example, a discharge cycle may begin by an operator requesting vehicle movement. If a discharge cycle is started, routine 1300 returns to 1304. Otherwise, routine 1300 returns to 1318.

At 1324, routine 1300 determines the voltage of each battery cell in the battery cell stack and continues to charge battery cells that are at charge level less than a threshold charge. In particular, battery cells that are at a charge level that is less than an upper threshold charge continue to charge via the secondary current path until the battery cells reach the threshold voltage.

At 1326, routine 1300 judges whether or not all battery cells of a battery cell stack are at a desired charge threshold. In one example, the charge threshold is a full charge amount rating of a battery cell. In other examples, a charge threshold may be a predetermined amount of charge lower than a full charge amount rating of a battery cell. In one example, routine 1300 assesses the battery cell charge of all battery cells in the battery cell stack by measuring the voltage of each battery cell with the circuitry described in FIG. 4. The charge of each battery cell is compared to the upper threshold charge, and if the battery cell charge is less than the threshold charge, the individual battery cell continues to receive charge via the secondary current path.

In this way, the battery controller uses the individual series battery cell voltage measurements and the primary and secondary current paths to bring the battery cell stack into balance. Consequently, all series battery cells arrive at the same upper charge level. Thus, during the charging cycle the secondary current path supplies charge to battery cells that have not reached an upper charge threshold. If routine 1300 judges that a charge of each battery cell in the battery cell stack is greater than an upper charge threshold, routine 1300 proceeds to 1304. Otherwise, routine 1300 proceeds to 1328.

At 1328, routine 1300 judges whether or not a battery discharge cycle is started. In one example, a battery discharge cycle may be initiated by an operator of a vehicle disconnecting an external battery charging system from the battery pack. If a battery discharge cycle has started routine 1300 returns to 1304. Otherwise, routine 1300 returns to 1324.

Figure 14:
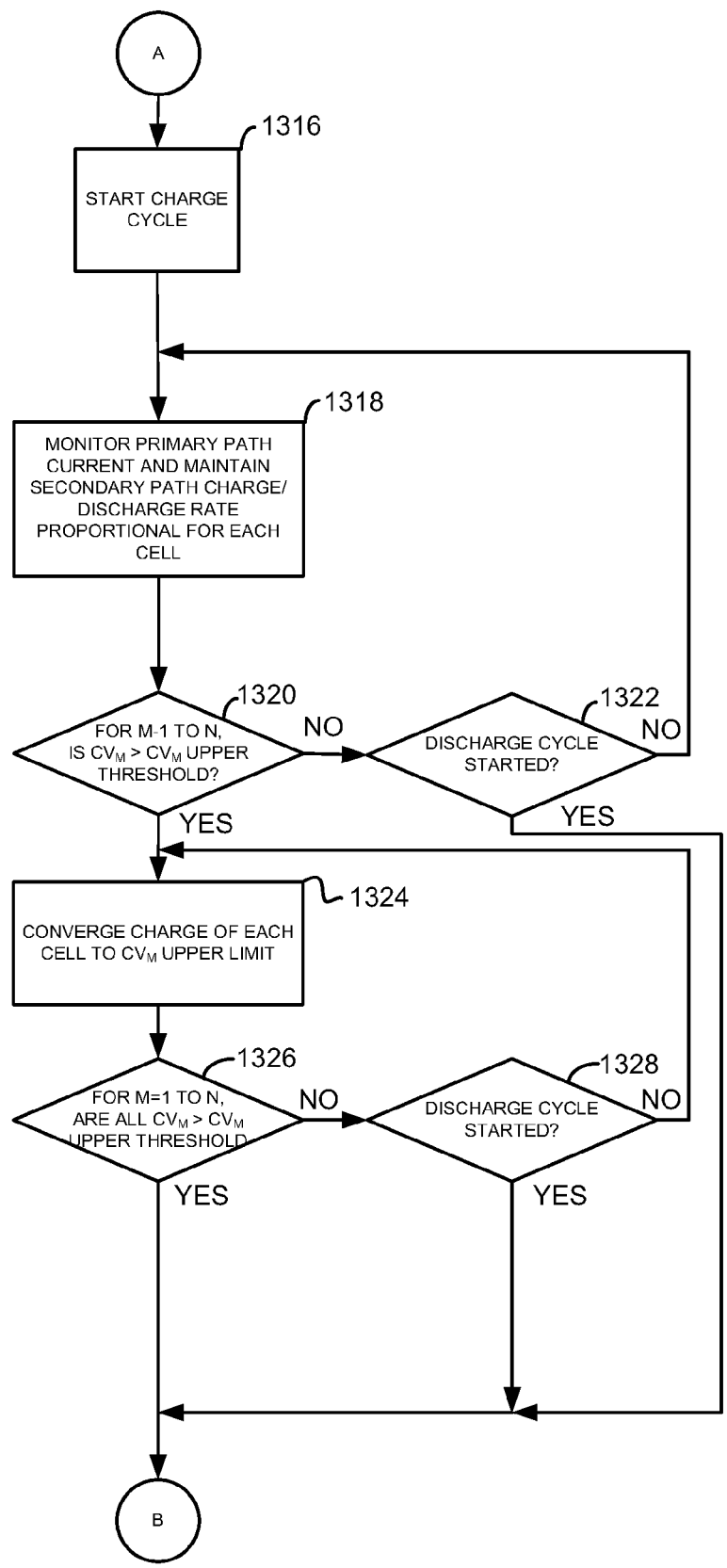
FIG. 14 shows a continuation of the flow chart illustrated in FIG. 13.

It should be mentioned that while the method of FIGS. 13-14 is described with regard and in relation to a battery cell stack, the operations of FIGS. 13-14 may be performed with regard to a battery pack as well. In particular, the operations above describing a battery cell stack may be applied to a battery pack. For example, an array $DC_M$ may contain secondary path charge current for each cell of a battery pack. Thus, the array $DC_M$ may contain secondary path charge current for several battery cell stacks. Accordingly, the array $DC_M$ may be updated by normalizing the remaining charge of each battery cell with the battery cell of the battery pack that has the lowest level of charge at the end of a battery discharge cycle.

Figure 15:
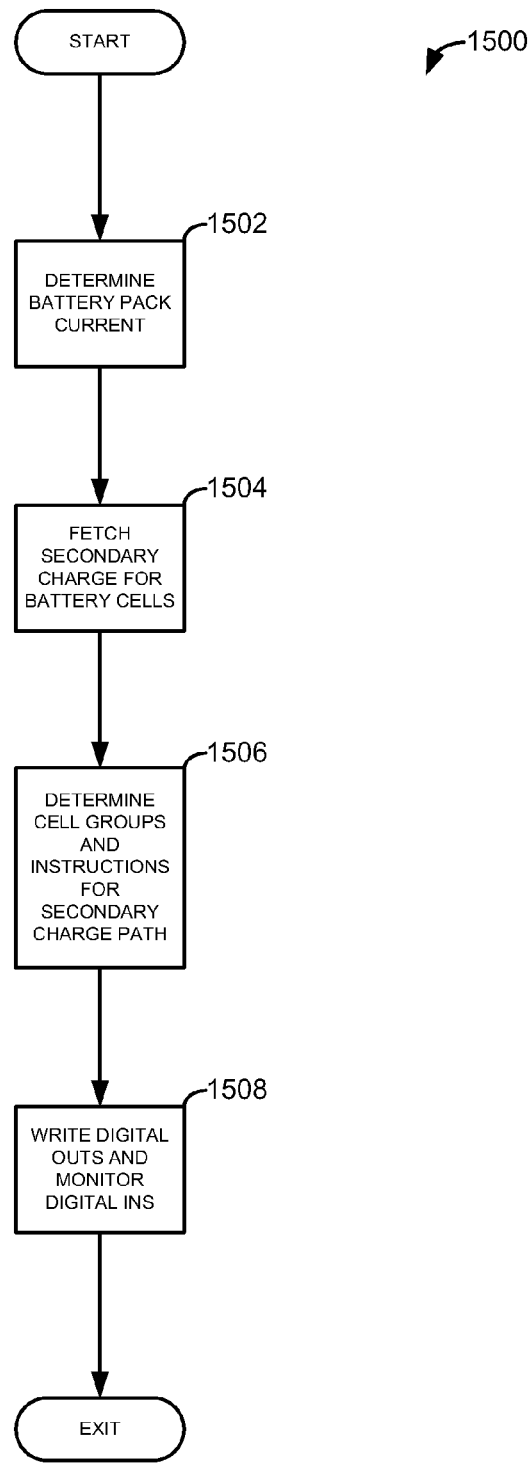
FIG. 15 shows a flow chart illustrating a method for maintaining secondary path charge proportional to battery pack current.

Referring now to FIG. 15, a flow chart illustrating a method for maintaining secondary path charge proportional to battery pack current is shown. Routine 1500 begins at 1502 where battery pack current is determined. In one example, the battery pack current is determined from a current shunt circuit. Routine 1500 proceeds to 1504 after battery pack current is determined.

At 1504, routine 1500 fetches secondary path charging and discharging rates for battery cells. In one example, secondary path charging rates are fetched from a routine that controls battery cell charge, the method of FIGS. 13-14 for example. In particular, the secondary path charge amount for each battery cells during a discharge cycle is retrieved from array $DC_M$. Alternatively, if the battery is in a charging cycle, the secondary path charge amount is retrieved from array $CC_M$. Routine 1500 proceeds to 1506 after charging rates are retrieved.

At 1506, routine 1500 determines cell groups and charging signal timings for controlling flyback transformers in a secondary current path. In particular, the outputs of the microcontroller that are associated with cells of arrays $DC_M$ and $CC_M$ having positive and negative values are determined from a map or instructions that associate digital outputs with array locations in $DC_M$ and $CC_M$. In one example, when a positive value is in an array location, a transistor associated with supplying current to the primary side of a flyback transformer is activated. On the other hand, when a negative value is in an array location, a transistor associated with drawing current from a battery cell via the secondary side of the flyback transformer is activated. The microcontroller digital outputs controlling flyback transformers have an on-time or pulse duration that is adjustable in response to a rate of charge. Additional details of timing of signals for flyback transformers are described with regard to FIGS. 9-11.

In one example, the values stored in $DC_M$ and $CC_M$ are input to a function that relates a battery cell charge rate to a flyback pulse duration. The pulse duration is output by the microcontroller by setting and re-setting digital outputs during a timing window. In particular, the states of digital outputs are controlled with respect to microcontroller instruction time and the desired battery cell charge rate. For example, the pulse is started by turning on the digital output and the pulse is stopped by turning off the digital output. Pulse timing is controlled with respect to microcontroller instruction time and the desired battery cell charge rate.

The digital outputs are assembled into groups (e.g., see FIGS. 9-10) because digital inputs and outputs are read or written by operations involving a digital word or byte. In one example, the digital outputs associated with activating transistors that can supply current to the primary coils of flyback transformers (e.g., transistor 1236 of FIG. 12) are in a first group of digital outputs, while digital outputs associated with activating transistors that can supply current to the secondary coils of flyback transformers (e.g., transistor 1226 of FIG. 12) are in a second group of digital outputs. Thus, several digital inputs and outputs may be simultaneously controlled. The groups of digital inputs and outputs that are operated during a particular microcontroller timing window may be defined according to system architecture and battery cell charging requirements. Battery cells that require charge during a microcontroller timing window can be determined by finding which elements or cells of arrays $DC_M$ and $CC_M$ have positive values. Battery cells that have charge drawn from them during a charging cycle can be determined by finding the battery cells of arrays $DC_M$ and $CC_M$ that have negative values. The battery cells that correspond to the cell locations having positive and negative values are the battery cells that require charging or discharging. Further, particular cells of array $DC_M$ are mapped to particular groups of digital bits so that the appropriate flyback transformers are activated during battery charging and discharging cycles. Routine 1500 proceeds to 1508.

At 1508, digital outputs and inputs are read. In one example, a group of digital outputs are written simultaneously. Further, a group of digital inputs related to the states of flyback transformers is read simultaneously. The digital input and outputs may be controlled so as to vary the timing and duration of charge provided or removed by flyback transformers (e.g., see FIGS. 9-10 and 16). Routine 1500 proceeds to exit after digital inputs are read and after digital outputs are written.

Thus, the methods of FIGS. 13-15 provide for a method for extending usable capacity of a battery pack, comprising: charging a plurality of battery cells via a first current path during a charging cycle of said battery pack; charging at least a first battery cell of said plurality of battery cells during said charging cycle via a second current path; and discharging at least a second battery cell of said plurality of battery cells during said charging cycle via said second current path. The method including wherein said first battery cell and said plurality of battery cells comprise a battery cell stack. The method including wherein said charging of said at least said first battery cell and said discharging of said at least said second battery cell is performed via a first flyback transformer and a second flyback transformer. The method including wherein the power is supplied to a primary coil of said first flyback transformer and where power is supplied to a secondary coil of said second flyback transformer. The method including wherein a capacitor supplies charge to said first flyback transformer and is supplied charge from said second flyback transformer. The method including wherein a rate at which charge is supplied to said at least said first battery cell is increased by increasing a pulse width supplied to a flyback transformer. The method including wherein a rate at which charge is removed from said at least said second battery cell is increased by increasing a pulse width supplied to a flyback transformer.

The methods of FIGS. 13-15 also provide for a method for extending the usable capacity of a battery pack, comprising: discharging a first battery cell via a first current path and charging said first battery cell via a second current path during a battery discharge cycle; discharging a second battery cell via said first current path and discharging said second battery cell via said second current path during said battery discharge cycle; charging said first battery cell via said first current path and discharging said first battery cell via said second current path during a battery charging cycle, said battery charging cycle after said battery discharge cycle; and charging said second battery cell via said first current path while charging said second battery cell via said second current path during said battery charging cycle. The method including wherein said first and second battery cells are charged and discharged via first and second flyback transformers. The method including wherein a switch electrically coupled to a first coil of said first flyback transformer controls a charging rate of said first battery cell, and wherein a switch electrically coupled to a first coil of said second flyback transformer controls a charging rate of said second battery cell. The method including a switch electrically coupled to a second coil of said first flyback transformer controls a discharge rate of said first battery cell, and wherein a switch electrically coupled to a second coil of said second flyback transformer controls a discharge rate of said second battery cell. The method including wherein a rate of discharging said first battery cell via said second current path during said battery charging cycle is related to a rate of charging said first battery cell via said second current path during said battery discharging cycle. The method including wherein a rate of charging of said second battery cell via said second current path during said battery charging cycle is related to a rate of discharging of said second battery cell via said second current path during said battery discharging cycle.

Further, the methods of FIGS. 13-15 provide for a method for extending the usable capacity of a battery pack, comprising: charging a plurality of battery cells via a first current path during a charging cycle of said battery pack; and charging at least a first battery cell of said plurality of battery cells during said charging cycle via a second current path, at least a portion of current in said second current path drawn from said first battery cell.

Further still, the methods of FIGS. 13-15 provide for a method for actively balancing charge of a battery pack, comprising: discharging a plurality of battery cells through a first current path during a battery discharge cycle; charging a first battery cell via a second current path during said battery discharge cycle; and discharging a second battery cell via said second current path during said battery discharge cycle, said second battery cell discharging at least during a portion of time when said first battery cell is charging. The method including wherein said second battery cell is discharged for a longer period of time than said first battery cell. The method further comprising charging a third battery cell during said battery discharge cycle, said third battery cell charged at a different timing than said first battery cell. The method including wherein charging of said first battery cell and said third battery cell overlaps. The method including wherein charging of said first battery cell and said third battery cell does not overlap.

Further still, the methods of FIGS. 13-15 provide for a method for actively balancing charge of a battery pack, comprising: discharging a plurality of battery cells via a first current path during a second battery discharge cycle; providing charge to a first battery cell via a first flyback transformer during said second battery discharge cycle, said flyback transformer in a second current path; providing charge to a second battery cell via a second flyback transformer during said second battery discharge cycle, said second flyback transformer in said second current path, said charge provided to said second battery cell by providing charge to said second flyback transformer at a different timing than charge provided to said first flyback transformer. The method including wherein said charge provided to said second flyback transformer is provide after said charge is provided to said first flyback transformer. The method including wherein said charge provided to said first flyback transformer is provided on a periodic basis during said second battery discharge cycle. The method including wherein a period of said periodic basis is related to a characteristic of said first flyback transformer. The method including wherein said characteristic is a coil saturation time. The method including wherein said first flyback transformer and said second flyback transformer are in different groups of transformers that are supplied charge during said second battery discharge cycle. The method including wherein said second battery discharge cycle is after a first battery discharge cycle, and wherein said charge provided to said first flyback transformer is related to an amount of charge remaining in said first battery cell after said first battery discharge cycle.

Referring now to FIG. 16, a schematic diagram of simulated electrical signals for charging and discharging a group of battery cells is shown. The X-axis of each plot represents time, and time increases from left to right. The Y-axis of each plot represents voltage applied to a primary or secondary coil of a flyback transformer. Flyback transformers receiving battery cell charging signals are denoted similar to the first plot from the top "CELL 1 CHARGE COMM." This abbreviation identifies the signal as the battery cell number one charge command (e.g., a signal applied to a transistor configured like transistor 1236 of FIG. 12). Flyback transformers receiving battery cell discharging signals are denoted similar to the fourth plot from the top "CELL 4 DCHARGE COMM." This abbreviation identifies the signal as the battery cell number four discharge command (e.g., a signal applied to transistor configured like transistor 1226 of FIG. 12). A higher level indicates voltage is being applied to the primary side of a flyback transformer to charge a battery cell or a higher level indicates a voltage being applied to the secondary side of a flyback transformer to discharge a battery cell. In this example, battery cells 1-3 may be in a first group of battery cells, and battery cells 4-6 may be grouped in a second group of battery cells.

FIG. 16 shows battery cells numbered 1-3 receiving charge as related to charging commands 1602-1612. Notice that the duration of charge transfer for battery cell number 2 at 1606 and 1608 is longer than the charge duration commands for battery cells 1 and 3 as indicated at 1602, 1604, 1610, and 1612. Increasing the charging time of battery cell 2 at 1606 and 1608 increases the amount of charge transferred to battery cell number 2. Further, the charging times 1602-1612 are staggered in time so that all battery cells are not charged at the same time. By varying the charging time of battery cells it is possible to reduce the instantaneous current draw for charging battery cells.

Battery cells 4-6 are discharged by discharge commands 1614-1624. At 1614 and 1616 battery cell 4 is discharged, while at 1618 and 1620 battery cell 5 is discharged. Further, battery cell 6 is discharged at 1622 and 1624. It should be noted that although the charging commands and discharging commands are indicated by the same level of voltage, the voltage applied to the primary side of flyback transformers (e.g., during battery cell charging) may be higher than the voltage applied to the secondary side of flyback transformers (e.g., to discharge battery cells). In one example, the voltage applied to the primary side of flyback transformers is sourced from a DC/DC converter or a capacitor as is described in reference to FIG. 12. In another example, the voltage may be supplied by a capacitor. The voltage applied to the secondary side of flyback transformers is sourced from an individual battery cell and may be less than 4 volts. Consequently, the discharge command signal applied to a transistor controlling current flow to the secondary of a flyback transformer may be longer than the duration of a charge command signal applied to a transistor controlling current flow to the primary of a flyback transformer even though the same amount of charge may be added to one battery cell as is removed from another battery cell. Further, the duration of the charging command and the discharging command may be different due to a difference in the number of turns of a primary coil as compared to the number of turns in the secondary coil. Further, the battery cell discharging commands may be staggered in time so as to vary the charge delivered to the secondary current path.

The discharge commands 1618 and 1620 are longer than discharge commands 1614, 1616, 1622, and 1624 indicating that additional charge is extracted from battery cell 5 as compared to battery cells 4 and 6. Further, charging commands 1602, 1604, 1606, and 1608 overlap discharging commands 1618-1620. By overlapping the battery cell charging and discharging commands, the net current flow in the secondary current path can be controlled to substantially zero. Further, variations of current and voltage in the secondary current path is controlled by overlapping charging and discharging of battery cells.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for extending a useable capacity of a battery pack, comprising:
discharging a battery cell via a first current path during a battery discharge cycle; and
charging said battery cell via a second current path during said battery discharge cycle.

2. The method of claim 1, wherein said battery cell and said plurality of battery cells comprise a battery cell stack and where said charging of said battery cell is in proportion to an amount of current provided by said battery pack to a load external to said battery pack.

3. The method of claim 1, wherein said battery cell is charged with charge from a plurality of battery cells of said battery pack.

4. The method of claim 1, wherein said battery cell is charged by an output of a DC/DC converter.

5. The method of claim 1, wherein said battery cell is charged at a rate related to an average charge of other battery cells comprising said plurality of battery cells.

6. The method of claim 1, wherein charging of said battery cell is regulated by a variable conductance switch.

7. The method of claim 6, wherein said variable conductance switch is a field effect transistor.

8. A method for extending a useable capacity of a battery pack, comprising:
discharging a plurality of battery cells through a first current path during a battery discharge cycle;
stopping said battery discharge cycle when a voltage of a battery cell of said plurality of battery cells is less than a threshold;
charging said plurality of battery cells during a battery charging cycle, said plurality of batteries charged through said first current path; and
charging at least one of said plurality of battery cells through a second current path during said battery charging cycle.

9. The method of claim 8, wherein said second current path includes at least one variable conductance switch, and where said stopping includes stopping said battery discharge cycle when a voltage of any of said plurality of battery cells is less than the threshold, and where said charging at least one of said plurality of battery cells through said second current path during said battery charging cycle includes charging less than all of said plurality of battery cells.

10. The method of claim 8, further comprising stopping to charge said plurality of battery cells through said first current path during a condition and supplying current from said first current path to said second current path to charge at least one battery cell of said plurality of battery cells.

11. The method of claim 10, wherein said condition is at least one battery cell at a threshold voltage.

12. The method of claim 8, wherein said first current path includes said plurality of battery cells.

13. A system for extending a useable capacity of a battery pack, comprising:
a plurality of battery cells;
a first current path for charging and discharging at least one battery cell, said first current path including said at least one battery cell of said plurality of battery cells;
a second current path selectively magnetically coupled to said at least one battery cell, said second current path providing charge to said at least one battery cell, said charge provided according to a state of said at least one battery cell.

14. The system of claim 13, wherein said second current path further includes a DC/DC converter.

15. The system of claim 13, wherein said system further includes a plurality of voltage measurement circuits coupled to said plurality of battery cells.

16. The system of claim 13, further comprising a controller that selectively electrically couples said second current path to said first current path.

17. The system of claim 13, wherein said second current path includes a variable conductance switch.

18. The system of claim 13, wherein said battery cells are lithium-ion battery cells.

19. The system of claim 17, wherein said variable conductance switch is a field effect transistor.

20. The system of claim 13, further comprising a controller, said controller including instructions for adjusting charging of at least a battery cell via a secondary current path according to the state of said at least one battery cell.

* * * * *